(12) United States Patent
Dierickx

(10) Patent No.: US 8,440,957 B2
(45) Date of Patent: *May 14, 2013

(54) COUNTING PIXEL WITH GOOD DYNAMIC RANGE PROPERTIES

(75) Inventor: Bart Dierickx, Edegem (BE)

(73) Assignees: Bart Dierickx, Edegem (BE); Caeleste CVBA, Edegem (BE)

( * ) Notice: Subject to any disclaimer, the term of this patent is extended or adjusted under 35 U.S.C. 154(b) by 96 days.

This patent is subject to a terminal disclaimer.

(21) Appl. No.: 12/748,483

(22) Filed: Mar. 29, 2010

(65) Prior Publication Data

US 2011/0210235 A1 Sep. 1, 2011

Related U.S. Application Data

(63) Continuation-in-part of application No. 12/392,637, filed on Feb. 25, 2009, now Pat. No. 8,198,577.

(60) Provisional application No. 61/164,684, filed on Mar. 30, 2009.

(51) Int. Cl.
*H01J 40/14* (2006.01)

(52) U.S. Cl.
USPC ..................................... 250/214 R

(58) Field of Classification Search .............. 250/214 R, 250/208.1; 356/313–316
See application file for complete search history.

(56) References Cited

U.S. PATENT DOCUMENTS

| | | | |
|---|---|---|---|
| 5,321,261 A | 6/1994 | Valenta | |
| 5,841,384 A | 11/1998 | Herman et al. | |
| 7,352,888 B2 * | 4/2008 | Luo et al. | 382/132 |

OTHER PUBLICATIONS

Perenzoni, M. et al., "A Multi-Spectral Analog Photon Counting Readout Circuit for X-Ray Hybrid Pixel Detectors", IMTC 2006—Instrumentation and Measurement Technology Conference, Sorrento, Italy, Apr. 24-27, 2006; 0-7803-9360-0/06, IEEE, p. 2003-2006.

Ballabriga, R. et al., "The Medipix3 Prototype, a Pixel Readout Chip Working in Single Photon Counting Mode with Improved Spectrometric Performance", IEEE Transactions on Nuclear Science, vol. 54, No. 5, Oct. 2007, p. 1824-1829.

Lazzaro, J. et al., "Winner-Take-All Networks of O(N) Complexity", Computer Science Department Technical Report Calitech-CS-TR-21-88, California Institute of Technology, Pasadena, CA 91125, 1988.

Liu, M., "CMOS Winner-Take-All Circuits: A Tutorial", EDN Jun. 26, 2007, http://www.edn.com/article/CA6454765.html#ref.

Dierickx, B. et al., "X-Ray Image Sharpening by Coincidence Detection," Poster Presentation at IEEE International Image Sensor Workshop, Jun. 26, 2009, Bergen, Norway.

* cited by examiner

*Primary Examiner* — Thanh Luu
(74) *Attorney, Agent, or Firm* — Bacon & Thomas, PLLC

(57) ABSTRACT

The present invention provides an array of pixels for the detection of a flash of electromagnetic radiation or a cloud of impinging high energy particles. Each pixel in the array comprises a radiation receptor for converting the electromagnetic radiation or impinging high energy particles into a radiation signal, and a converter for converting the radiation signal into pulses. The array further comprises a circuit for comparing one or more of the criteria pulse amplitude, pulse arrival time, time to convert a pulse in a digital signal, pulse duration time, pulse rise and fall time or integral of pulse over time for pulses coinciding on pixels in a predetermined neighborhood. The array also comprises a circuit for suppressing those pulses that are compared negatively versus the corresponding pulses in another pixel of the neighborhood for the same one or more criteria. A corresponding method is also provided.

19 Claims, 16 Drawing Sheets

COUNTING PIXEL WITH GOOD DYNAMIC RANGE PROPERTIES

CROSS REFERENCE TO RELATED APPLICATIONS

This application is a Continuation-In-Part of application Ser. No. 12/392,637 filed Feb. 25, 2009, now U.S. Pat. No. 8,198,577 and the benefit of provisional Application No. 61/164,684 filed Mar. 30, 2009 is claimed; both applications are incorporated herein by reference.

FIELD OF THE INVENTION

The present invention relates to detection of electromagnetic radiation or high energy particles. In particular, the present invention relates to methods and devices for detection of electromagnetic radiation or high energy particles, such as for example for X-ray detection, or such as photon counting of visible light.

BACKGROUND OF THE INVENTION

X-radiation (composed of X-rays) is a form of electromagnetic radiation. X-rays have a wavelength in the range of 10 to 0.01 nanometers, corresponding to frequencies in the range $30 \times 10^{15}$ Hz to $30 \times 10^{18}$ Hz, and energies in the range 120 eV to 120 keV. X-rays are primarily used for diagnostic radiography and for crystallography.

X-rays are generated by an X-ray tube, a vacuum tube that uses a high voltage to accelerate electrons released by a hot cathode to a high velocity. The high velocity electrons collide with a metal target, the anode, thus creating the X-rays ("Brehmsstralung"). The X-ray photons are emitted in pulses with variable duration.

The detection of X-rays may be based on various methods. The most commonly known methods are a photographic plate and X-ray film.

Since the 1970s, semiconductor detectors have been developed (for example silicon or germanium doped with lithium, Si(Li) or Ge(Li)). X-ray photons impinging on a semiconductor material are converted to electron-hole pairs in the semiconductor material and these charge carriers are collected and generate an electrical signal representative of the impinging X-rays.

State of the art X-ray image sensing is performed with pixels that are either "charge integrating" or "photon counting". The detection itself can be "direct" (where the X-ray photon creates a packet of secondary electron-hole pairs in the semiconductor material, that are subsequently read by a charge sensitive amplifier) or "indirect" (where the X-ray photon is absorbed in a scintillator material where it creates a flash of secondary, visible light, which secondary light is subsequently detected by a visible light image sensor).

In case of charge integration and indirect detection, an image sensor is used for detection of the secondary visible radiation. The image sensor converts this visible radiation into analog electrical signals (current or voltage). The more radiation impinges on the image sensor over time, the higher the corresponding electrical signal. Charge integrating pixels are simple electronic circuits. These have three or a few more transistors. Many examples exist in the state of the art, of which a very simple one is represented in FIG. 1. The image sensor 10 illustrated comprises a phototransducer such as a photodiode 11, for converting the impinging radiation 12 into an electrical signal such as for example a photocurrent. The thus generated photocurrent integrates on an integrating element such as a capacitor 13. A voltage buffer 14 may be provided between the integrating element 13 and read-out circuitry 15 for reading out a radiation value.

In principle the X-radiation consist of separate X-ray photons, which can be detected as separate pulses. For that reason a photon counting method may be more effective than charge integration for detection of the radiation. However, known counting pixels are complex devices. They have an analog front-end that detects pulses (the front end for example comprising a pulse shaper and a comparator) and an elaborate digital counter. The number of transistors is in the hundreds (100 . . . 1000). One example of such a counting pixel 20 is illustrated in FIG. 2. Every X-ray photon 21 which impinges on a phototransducer such as a photodiode 22 creates a small charge packet with hundreds of electrons, which is shaped to a pulse 25 by a pulse shaper circuit 23. A comparator 24 compares the generated pulses 25 to a reference value $V_{ref}$. Every time the amplitude of the pulses 25 exceeds the reference value $V_{ref}$, a first value, for example high or digital one, is assigned to the output signal of the comparator 24, and every time the pulses are below the reference value $V_{ref}$, a second value, for example low or digital zero, is assigned to the output signal of the comparator 24. This way, a binary signal is generated, comprising a pulse train 26. The pulses in the pulse train 26 are then counted by means of a digital counter 27 in order to provide a count value for the impinging incident photons 21.

It is generally understood that the counting approach is superior over the charge integrating approach in terms of noise. The counting of photons is essentially noise free (apart from the inherent photon shot noise—PSN), whereas in integrating mode, the collected noise charge is contaminated by analog "read noise".

A further advantage of photon counting is that one can do at the same time energy (or wavelength) discrimination, and thus obtain at the same time images for different bands of photon energies (which is referred to as "color X-ray", similar to the wavelength discrimination in visible light image sensors).

Nevertheless, it is a disadvantage of counting pixels that they require a huge, area and power consuming, yield killing digital counter.

Perenzoni M., Stoppa D., Malfatti M., and Simoni A. disclose in "A Multi-Spectral Analog Photon Counting Readout Circuit for X-Ray Hybrid Pixel Detectors", Instrumentation and Measurement Technology Conference 2006, Proceedings of the IEEE, Publication Date: 24-27 Apr. 2006, pages 2003-2006, an all-analog pixel architecture for the readout of X-ray pixel detectors. The pixel comprises a self-triggered reset charge amplifier, three autocalibrated comparators, an energy window identification logic and three analog counters with adjustable range. Perenzoni et al. thus show a pixel that avoids the use of a large digital counter, and replaces such digital counter with an analog domain counter. In their approach, the dynamic range is somewhat reduced due to the use of that analog counter, but still it keeps the capability to count several energy bands separately.

An implementation of a counting pixel with a (linear) analog counter according to the prior art is illustrated in FIG. 3. The X-ray photons 31 which impinge on a phototransducer such as a photodiode 32 create small charge packets with hundreds of electrons, which are shaped to pulses 33 by a pulse shaper circuit 34. A comparator 35 compares the generated pulses 33 to a reference value $V_{ref}$. Every time the amplitude of the pulses 33 exceeds the reference value $V_{ref}$, a first value, for example high or digital one, is assigned to the output signal of the comparator 35, and every time the pulses are below the reference value $V_{ref}$, a second value, for example low or digital zero, is assigned to the output signal of the comparator 35. This way, a binary signal is generated, comprising a pulse train 36. The pulses in the pulse train 36 are then counted by means of an analog counter 37 in order to provide a count value 38 for the impinging incident photons 31.

The analog counter 37 comprises a counting capacitor Cs onto which a signal representative of the number of detected photons is stored. Before counting is started, the counting capacitor Cs is reset to an initial value by means of a reset system, for example comprising a reset transistor (switch) 39. The charge is accumulated on the Capacitor Cs in the feedback loop of a charge transimpedance amplifier (CTIA).

One input port of the CTIA is connected to a reference value Ref; the other input port is connected to a second capacitor Cp via a first switch. The second capacitor Cp itself can be short-circuited via a second switch. The first and second switches are operated alternatively: one opens when the other closes and vice versa. The operation of the first and second switches is controlled by the input signal of the analog counter 37, i.e. by the binary pulse train 36.

Upon reception, by the analog counter 37, of a high pulse of the pulse train 36, the charge packet is stored on the second capacitor Cp, after which it is transferred to the counting capacitor Cs.

The counting is linear because the step height is constant, thus the output voltage 38 is a linear function of the number of pulses. In this actual circuit this is realized by accumulating fixed small charge packets. The fixed charge packets are realized by a fixed voltage over the second capacitor ($\Delta Q = \Delta V * C$). In this particular case the voltage step over the second capacitor $C_P$ is kept constant by the fact that the virtual ground of the CTIA keeps the voltage on the second capacitor $C_P$ independent of the already accumulated value on the counting capacitor Cs.

The ratio Cp/Cs determines the step height in the count signal 38 when counting impinging photons. If Cp or Cs are programmable, the step height can be programmed. Also when the voltage on Cp, or the voltage difference between Cp and Cs can be programmed, the step height is programmable.

R. Ballabriga et al., in "The Medipix3 Prototype, a Pixel Readout Chip Working in Single Photon Counting Mode With Improved Spectrometric Performance", IEEE Trans Nuclear Science, vol. 54, no. 5 (2007), demonstrated the possibilities of using information of multiple pixels for detecting a same impinging particle. They demonstrated that the accumulated charge of a multiplicity of pixels can be combined to recover the particle's total ionization charge. Key in this operation is the detection of "coincidence", i.e. of hits that happen at the same moment in neighboring pixels due to a same event.

CERTAIN INVENTIVE ASPECTS OF THE INVENTION

It is an object of embodiments of the present invention to provide a counting pixel with good dynamic range properties.

The above objective is accomplished by a method and device according to embodiments of the present invention.

In a first embodiment, the present invention provides an array of pixels for the detection of a flash of electromagnetic (EM) radiation or a cloud of impinging high energy particles. Each pixel in the array comprises a radiation receptor for converting the electromagnetic radiation or impinging high energy particles into a radiation signal, and a converter for converting the radiation signal into pulses. The array further comprises a circuit for comparing one or more of the criteria pulse amplitude (e.g. in a maximum takes all circuit), pulse arrival time (e.g. in a first takes all circuit), time to convert a pulse in a digital signal, pulse duration time (e.g. in a longest takes all circuit), pulse rise and fall time or integral of pulse over time (e.g. in a most energy takes all circuit) for pulses coinciding on pixels in a predetermined neighborhood. The array also comprises a circuit for suppressing those pulses that are compared negatively versus the corresponding pulses in another pixel of the neighborhood for the same one or more criteria.

With a neighborhood is either meant a group of pixels which are immediate neighbors of the pixel, or neighbors further away (neighbors of neighbors etc.). In particular embodiments of the present invention, a neighborhood of a pixel of interest is formed by pixels not more than 5 consecutive pixels away from the pixel of interest.

The circuit for suppressing those pulses that are compared negatively versus corresponding pulses in another pixel of the neighborhood for the same one or more criteria may comprise circuit elements for suppressing the detection made in pixels that are not at the position of the maximum of the flash of electromagnetic radiation or the cloud of impinging high energy particles. The circuit elements for suppressing the detection made in pixels that are not at the position of the maximum of the flash of electromagnetic radiation or the cloud of impinging high energy particles may be adapted for suppressing a pulse in a pixel of interest if the amplitude of the pulse of at least one other pixel in the neighborhood is larger.

In an array of pixels according to embodiments of the present invention, the circuit for suppressing those pulses that are compared negatively versus the corresponding pulses in another pixel of the neighborhood for the same one or more criteria may comprise a winner-take-all circuit. The winner-take-all circuit may be a local winner-take-all circuit, taking into account a predetermined limited neighborhood around a pixel under consideration.

In an array of pixels according to embodiments of the present invention, the array may furthermore comprise a circuit for performing coincidence detection on signals detected at different pixels. The circuit for performing coincidence detection may be adapted for performing coincidence detection on signals detected at pixels in the predetermined neighborhood.

An array of pixels according to embodiments of the present invention may furthermore comprise a circuit for logic operation on coinciding pulses of pixels in the predetermined neighborhood.

An array of pixels according to embodiments of the present invention may furthermore comprise a circuit for determining the position of the maximum of the flash of EM radiation or of the cloud of impinging high energy particles with higher precision than the pixel pitch, the circuit implementing centroiding or superresultion. At least some, and preferably all, of the pixels of the array may furthermore comprise a memory element for storing the result of the centroiding operation in a pixel. The array may be adapted for storing the result of the centroiding operation in the pixel that is on or near the maximum of the flash or of the cloud.

An array of pixels according to embodiments of the present invention may furthermore comprise a memory element for storing a measure of the spatial extension of the flash or cloud. The measure may for example be standard deviation. The measure of the spatial extension may be obtained, calculated or recorded. It may be stored inside a pixel or outside the pixel.

An array of pixels according to embodiments of the present invention may furthermore comprise a circuit for transferring a pixel value to the strongest pixel in the neighborhood if the pixel itself does not have the strongest pulse, and for retaining its value for subsequent pulse amplitude classification if the pixel itself is the local maximum or contains the center of gravity of the flash of electromagnetic radiation or the cloud of impinging high energy particles.

Pixels of an array according to embodiments of the present invention may furthermore comprise a digital, a linear analog, a non-linear analog, or a combined analog and digital counter or accumulator.

In a second embodiment, the present invention provides a method to improve the sharpness of an image sensor for determining EM or particle radiation of a flash of electromagnetic radiation or a cloud of impinging high energy particles, the method comprising comparing one or more of the criteria pulse amplitude (maximum takes all), pulse arrival time, time it takes to convert the radiation pulses into an electrical pulse (first takes all), pulse duration time (longest takes all), pulse rise and fall time or integral of pulse over time (most energy takes all) for pulses coinciding on pixels of the image sensor in a predetermined neighborhood, and suppressing those pulses that are compared negatively versus the corresponding pulses in a neighboring pixel for the same one or more criteria. Suppressing those pulses that are compared negatively versus the corresponding pulses in another pixel in the neighborhood for the same one or more criteria may comprise suppressing a count made in pixels that are not the position of the maximum of the flash of electromagnetic radiation or a cloud of impinging high energy particles. A non-suppressed count may constitute the sensor pixel information.

A method according to embodiments of the present invention may furthermore comprise performing coincidence detection on EM or particle radiation detected by different pixels of the image sensor. Performing coincidence detection may comprise performing coincidence detection on pixels in a predetermined neighborhood of each other.

It is an advantage of embodiments of the present invention that the advantages of photon counting, such as low noise (read noise free) and energy discrimination, are achieved while implementing low complexity analog circuitry.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Particular and preferred aspects of the invention are set out in the accompanying independent and dependent claims. Features from the dependent claims may be combined with features of the independent claims and with features of other dependent claims as appropriate and not merely as explicitly set out in the claims.

Aspects of the invention will be apparent from and elucidated with reference to the embodiment(s) described hereinafter.

BRIEF DESCRIPTION OF SOME OF THE DRAWINGS

FIG. 1 schematically illustrates an integrating pixel according to one of the many possibilities known in the state of the art.

FIG. 2 schematically illustrates a prior art photon counting pixel with a digital counter which may be used in the case of X-ray detection.

FIG. 3 schematically illustrates a prior art photon counting pixel with a linear analog accumulator.

FIGS. 4A and 4B schematically illustrate implementations of a photon counting pixel with a non-linear analog accumulator according to embodiments of the present invention. The scheme of FIG. 4A realizes a (decaying) exponential non-linear accumulation. The scheme in FIG. 4B realizes a power law which is close to a square root law, as the capacitance of the diode (varactor, variable capacitor) in the feedback loop is approximately $C \sim V^n$, where n is 0.3 ... 0.6.

FIG. 5 is an example of an analog accumulated signal in case of a photon counting pixel with linear analog accumulator as in FIG. 3 and in case of a photon counting pixel with non-linear analog accumulator in accordance with embodiments of the present invention such as in FIG. 4A.

FIG. 6 illustrates possible linear an non-linear laws and their corresponding photon shot noise for an analog accumulator according to embodiments of the present invention. Shown are a linear law and two non-linear laws that are of particular interest: an exponential law (approximating the behavior of FIG. 4A) and a square root law (e.g. realized by a circuit as FIG. 4B), which is a law that results in an optimal signal to noise ration of a wide dynamic range. The big symbols in the graph are the linear and non-linear laws themselves, the small symbols are the statistical "photon shot noise" on the same scale as the voltage reading of the analog accumulator.

Figure 8:
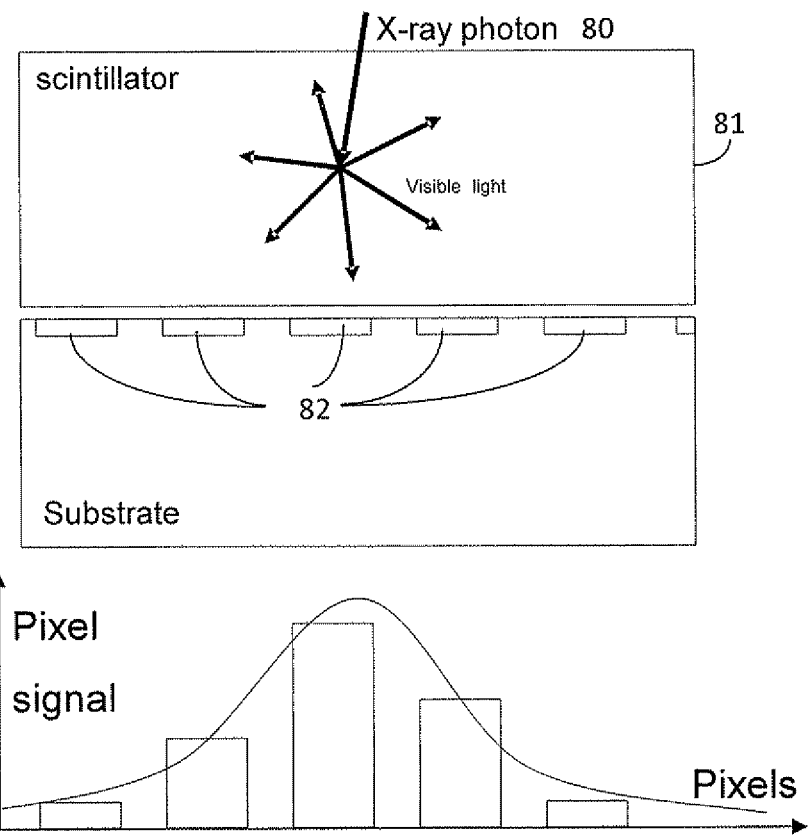

FIG. 8 illustrates in the top part a schematic cross-section of a pixel array covered with an X-ray scintillator. An X-ray photon generates a flash of visible light in the scintillator. The bottom part of FIG. 8 illustrates an example of an analog accumulator according to embodiments of the present invention that compares the pulse amplitude of coinciding pulses of neighboring pixels and suppresses the pulse if the pulse of at least one neighboring pixel is larger. This drawing shows such operation in one dimension only. In a two-dimensional pixel array, one may realize such operation in two dimensions.

Figure 9:
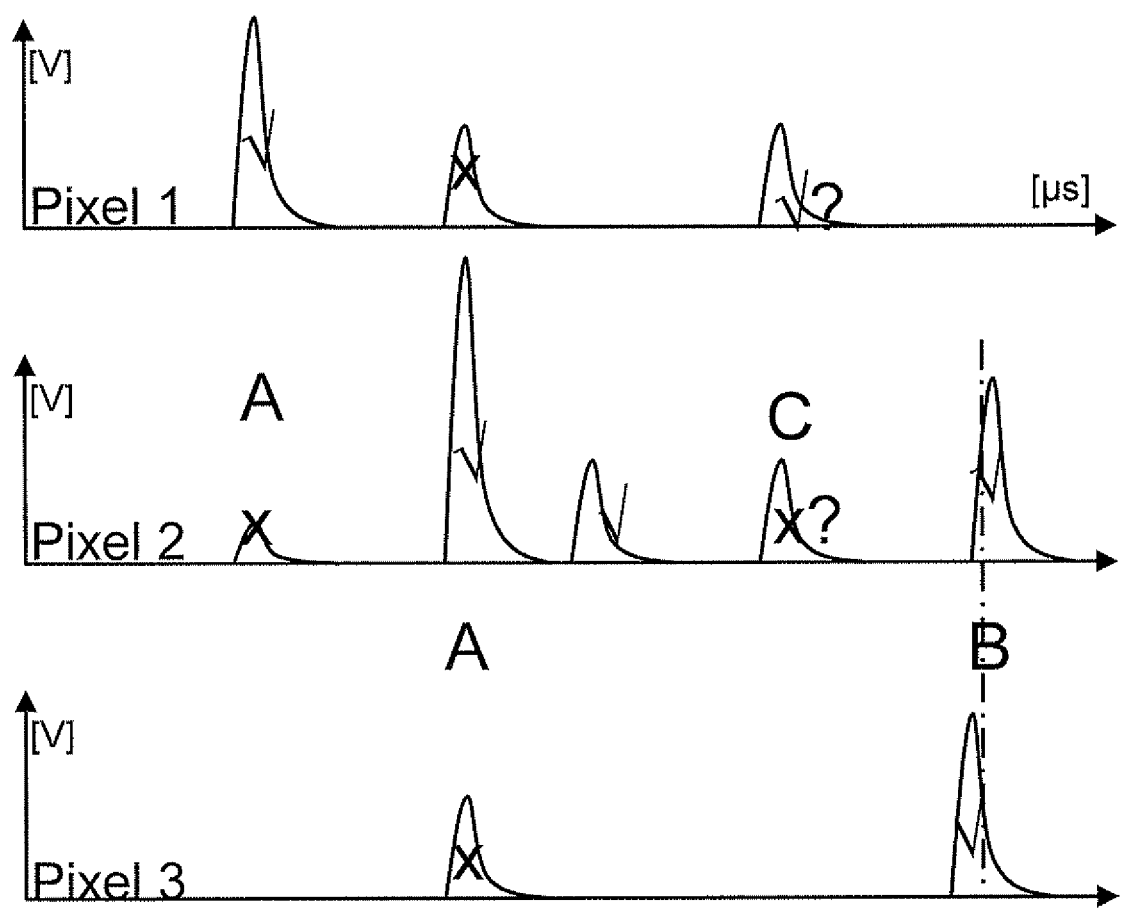

FIG. 9 illustrates time traces of three neighboring pixels. Pulses due to X-ray photons scintillating, arrive randomly in time. Pulse height is proportional to the amount of charge collected in a pixel.

Figure 10:
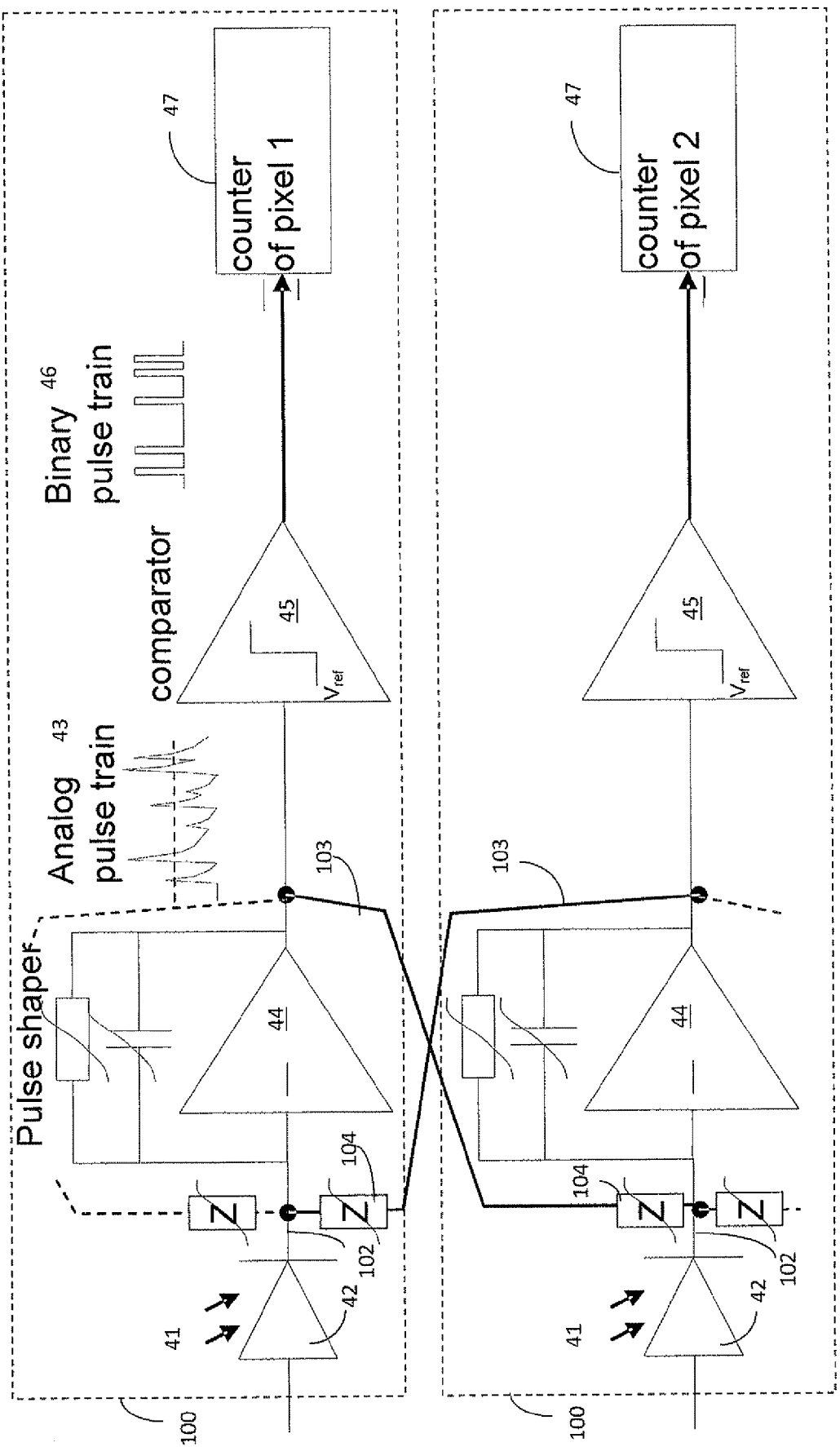

FIG. 10 illustrates one embodiment of a circuit implementation of the sharpening operation in accordance with embodiments of the present invention, where sharpening is performed in the charge (or photo-current) domain, shown with only two pixels.

Figure 11:
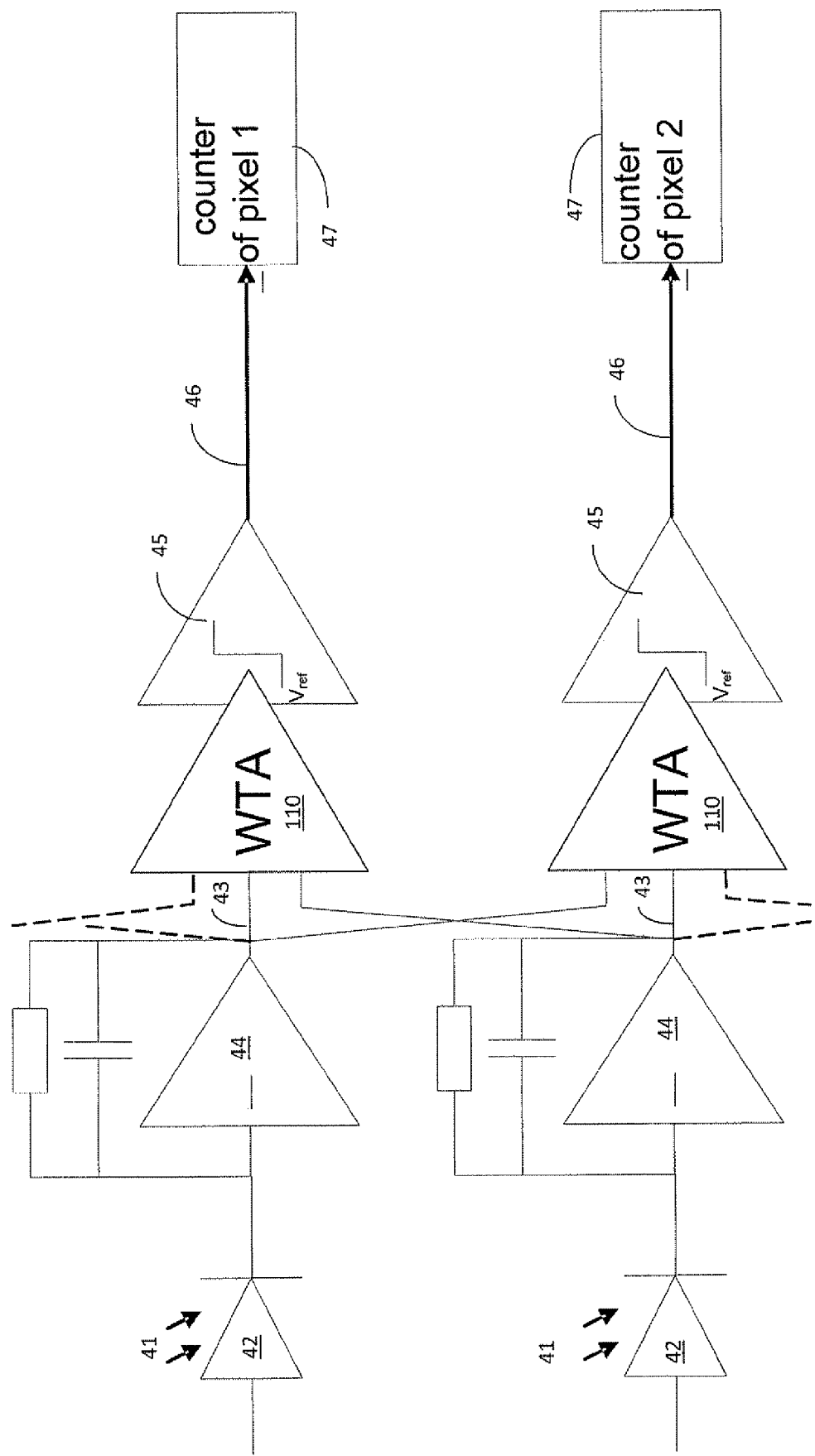

FIG. 11 illustrates an implementation of the sharpening operation according to embodiments of the present invention, where the sharpening is performed in the analog pulse domain: a winner-takes-all circuit (WTA) only propagates the pulse that is larger than its neighbors.

Figure 12:
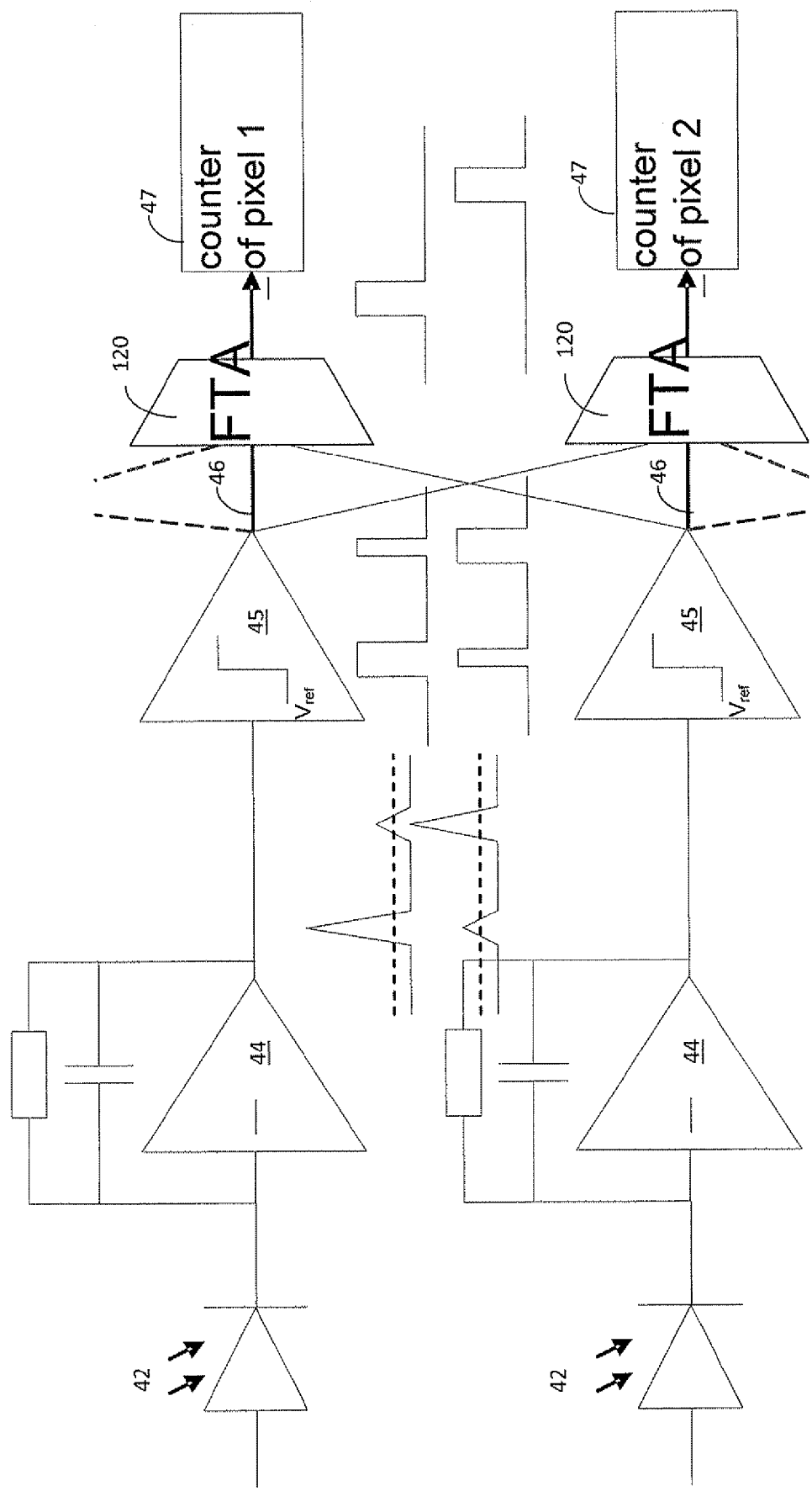

FIG. 12 illustrates an implementation of the sharpening operation in accordance with embodiments of the present invention, where the sharpening is performed in the digital pulse domain with a "First-takes-all" circuit: the pulse that comes first suppresses its neighbors.

Figure 13:
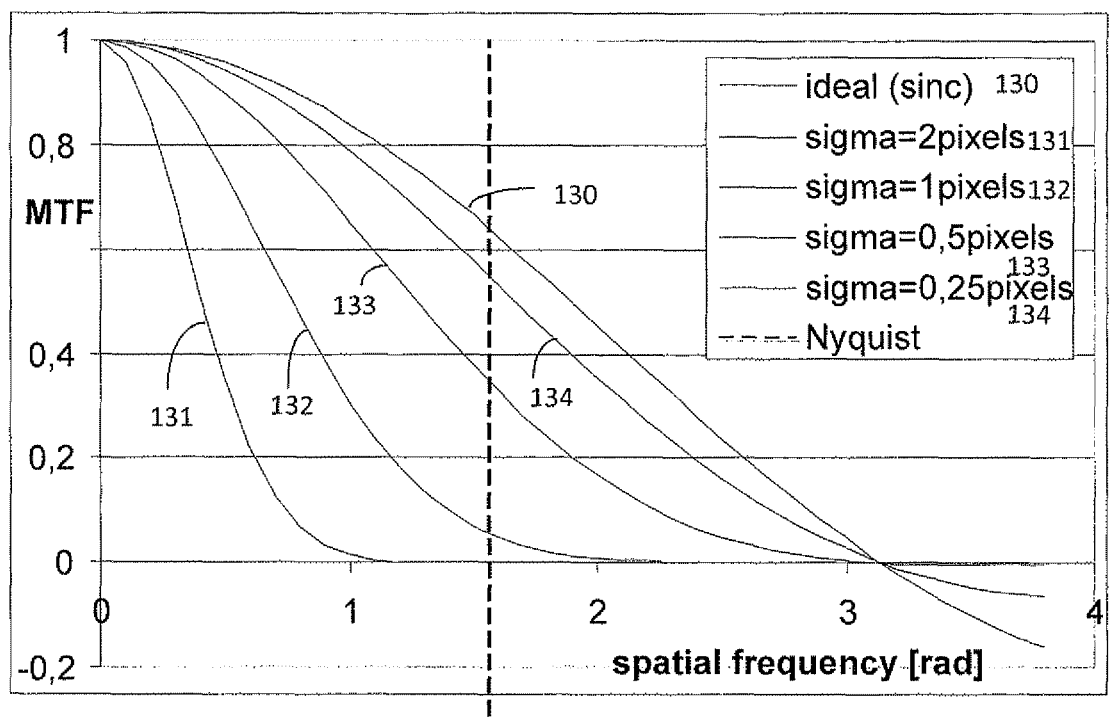

FIG. 13 illustrates MTF of an X-ray pixel with various degrees of blurring. Blurring is modeled as a Gaussian spread with its a expressed as a multiple of the pixel pitch.

Figure 14:
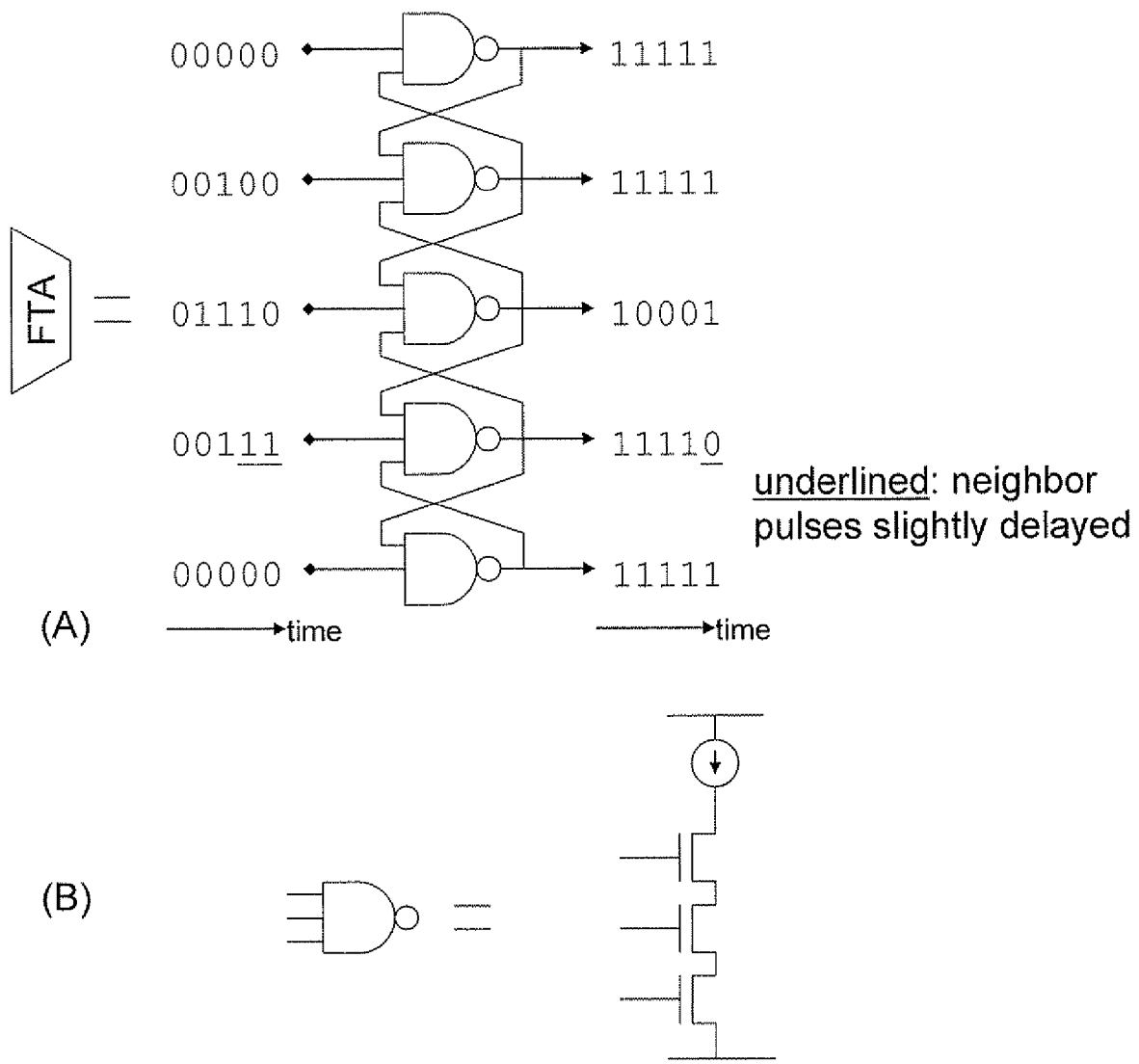

FIG. 14 illustrates a compact implementation of FTA according to an embodiment of the present invention.

Figure 15:
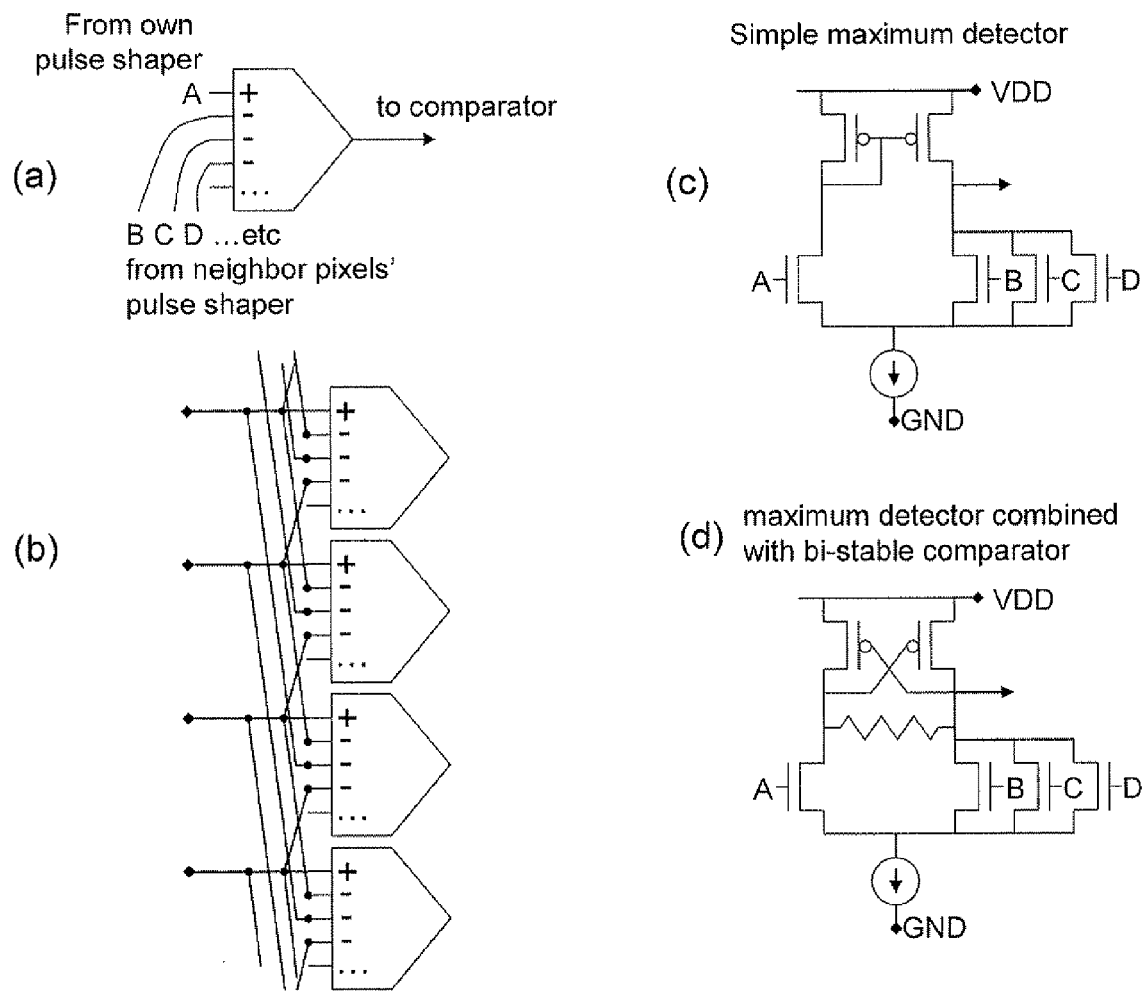

FIG. 15 illustrates an implementation of a "local maximum" detector according to embodiments of the present invention, which may be used where in other embodiments a WTA circuit is used.

Figure 16:
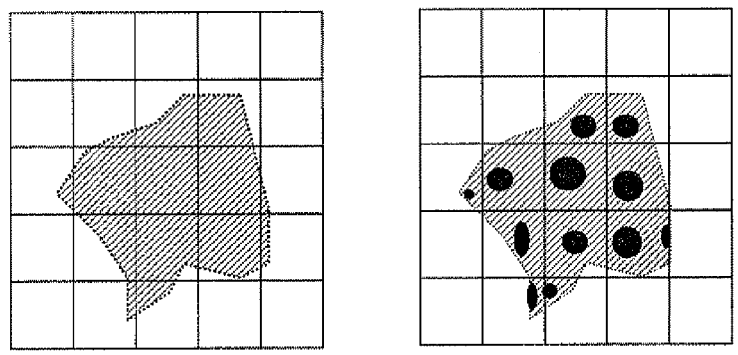

FIG. 16 illustrates what could be the result if each pixel accumulates the number of photon counts (as a value) from a centroiding operation around a group of pixels around the pixel when this pixel is the maximum pixel, their averaged position (shown as a spot within the pixel, and their spread in X and V direction (width and height of the ellipse around the averaged position). From this information, a sharper image than the classical pixel resolution (pixel grid) can be reconstructed.

Figure 17:
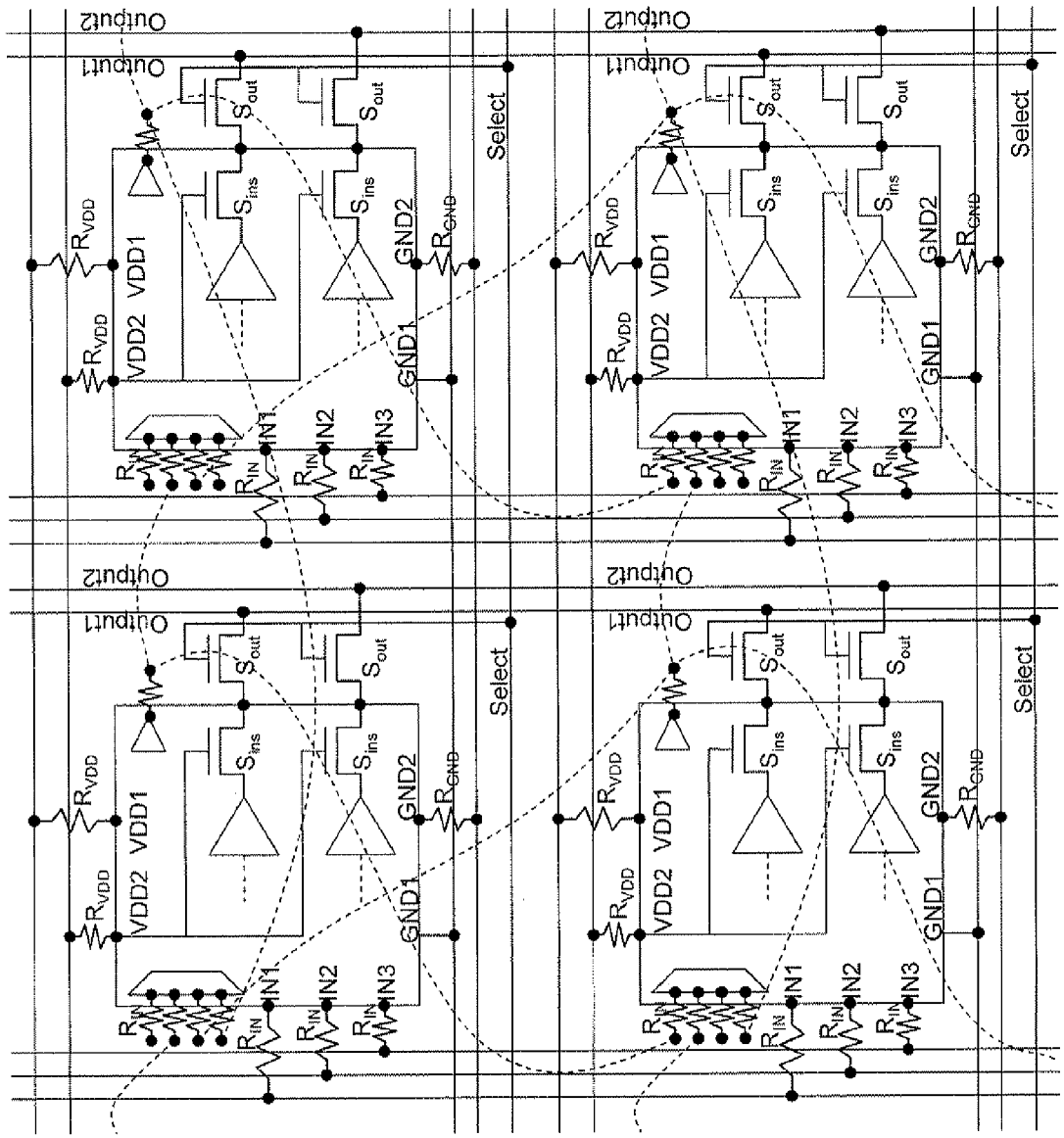

FIG. 17 illustrates a method according to embodiments of the present invention to improve the yield of an array of pixels. Shown in dotted lines are interconnections between inputs and outputs of neighboring pixels, such as needed for the WTA or FTA operators in accordance with embodiments of the present invention.

Figure 18:
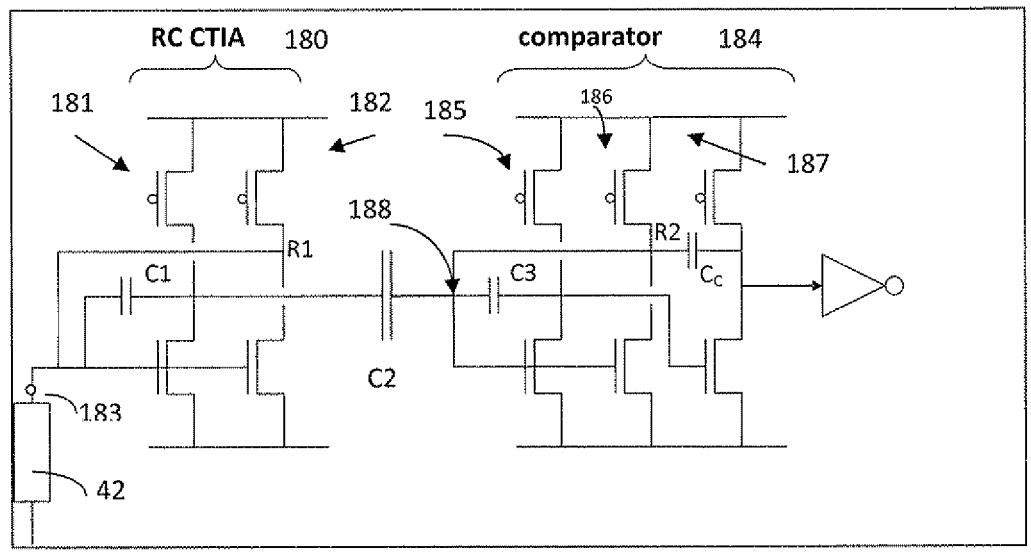

FIG. 18 illustrates a single ended implementation according to embodiments of the present invention of an RC feedback CTIA with a continuous time comparator.

Figure 19:
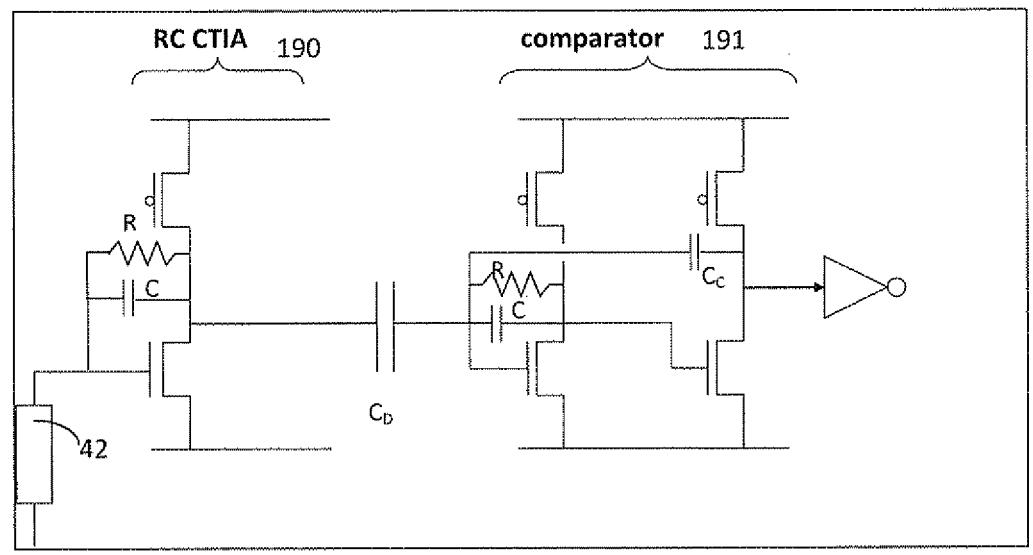

FIG. 19 illustrates a single ended implementation according to embodiments of the present invention of an RC feedback CTIA followed by a continuous time comparator.

Figure 20:
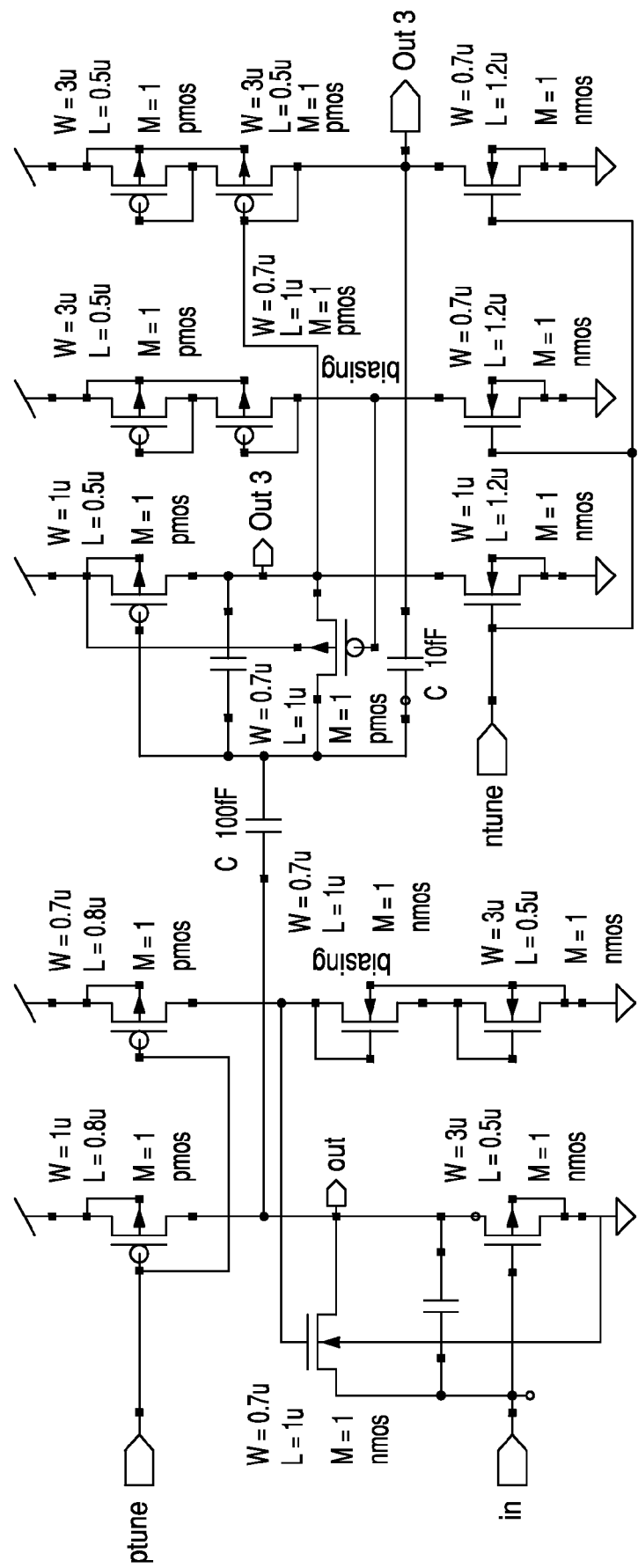

FIG. 20 illustrates a variant of FIG. 19 according to embodiments of the present invention, where the feedback resistor is implemented as a MOSFET.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

Hereinbelow, when using the wording "pulse" or "pulse train", this can mean depending on the context "analog pulse (train)", i.e. where the shape and amplitude can vary, or "digital pulse (train)", i.e. which is a binary signal for which the amplitude is a logic value (such as HIGH or LOW; 1 or 0).

The input signal to an image sensor pixel is the radiation intensity at the location of that pixel. The radiation may be any of optical light, IR light, UV light, high energy particles, X-rays, etc. In the following, embodiments of the present invention will be described with reference to X-rays. Embodiments of the present invention are particularly useful when the radiation intensity is low, more particularly so low that the impinging radiation arrives as single photons or pulses of photons rather than as a continuous stream of photons.

Figure 1:
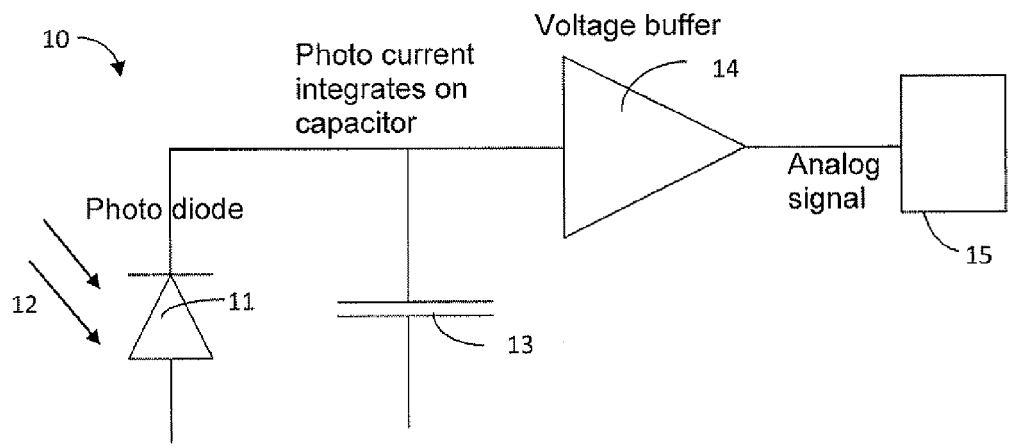
Figure 2:
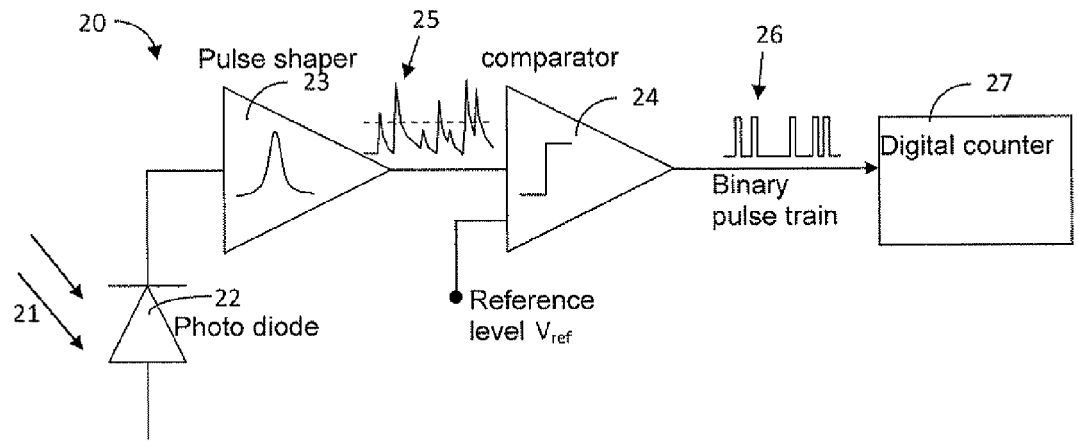
Figure 3:
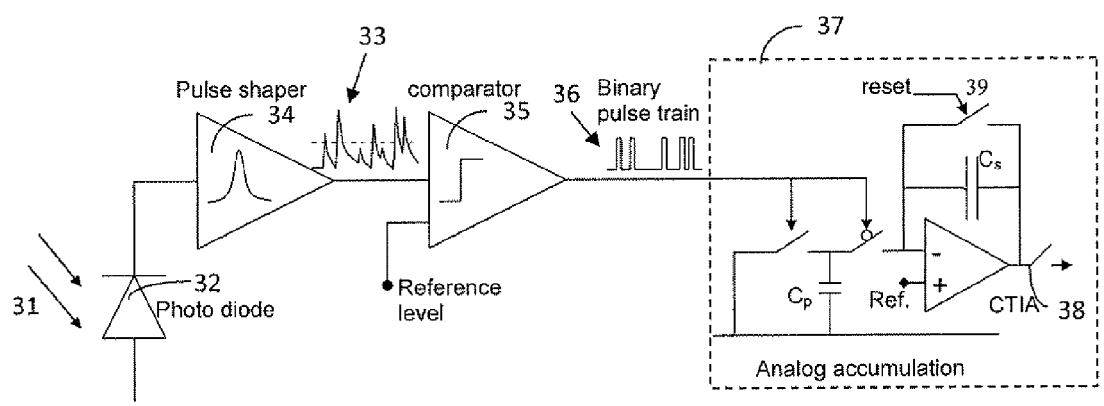
Figure 4A:
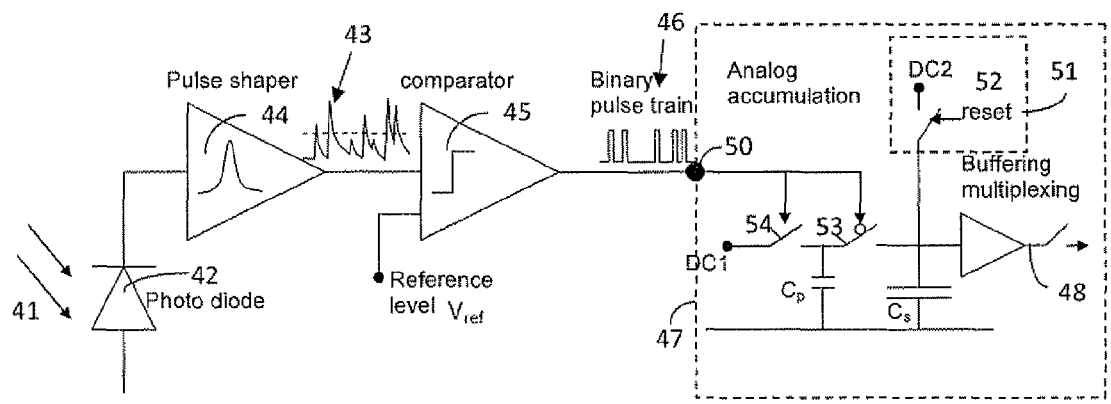
Figure 4B:
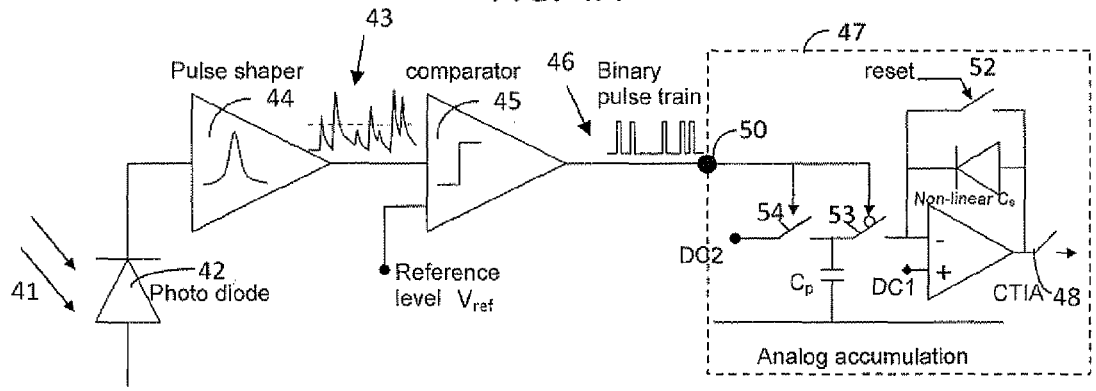

As illustrated in FIG. 4A and FIG. 4B, the intensity of the impinging X-rays 41 is transduced by a radiation receptor, e.g. a phototransducer (the sensor) and its associated circuits to an analog voltage at the output of the pixel. The sensing may be done via a sensor circuit, comprising a phototransducer such as, for example, a reverse-biased photodiode 42. The photodiode 42 collects photogenerated charge carriers, e.g. electrons, the charge carriers being generated under influence of the impinging X-rays 41 (a semiconductor substrate exposed to photons results in a release of charge carriers by the photoelectric effect). The charge carriers generate an electrical signal, such as e.g. a charge packet, a current or a voltage. For a linear phototransducer device the electrical radiation signal generated (either by amplitude, duration, integral or otherwise) is preferably proportional to the radiation intensity, i.e. to the number of impinging photons.

The X-ray photons 41 which impinge on the phototransducer such as photodiode 42 create, directly or indirectly, small charge packets with hundreds of electrons, which are shaped to analog electrical pulses 43 by a pulse shaper circuit 44. A comparator 45 compares the generated analog pulses 43 to a reference signal $V_{ref}$. The comparator 45 may have an adjustable threshold determining the reference signal $V_{ref}$; this allows separating the noise from the useful signal, and recognizing the energy of the photon. In the comparator 45, the analog signal is converted into a digital signal. Every time a relevant parameter, such as e.g. the amplitude, area, width or length, of the pulses 43 exceeds a corresponding parameter in the reference signal $V_{ref}$, a first value, for example high or digital one, is assigned to the output signal of the comparator 45, and every time the analog pulses 43 are below the reference value $V_{ref}$, a second value, for example low or digital zero, is assigned to the output signal of the comparator 45. This way, a binary signal is made, comprising a digital pulse train 46.

Suitable circuits for reading out pulsed signals (as from individual photons or particles creating charge packets, but also from explicit EM wave packets as from pulsed lasers etc.), and capable of converting a signal pulse to a count pulse are known to a person skilled in the art, for example from the Medipix project (CERN). The known pulse shapers essentially consist of two parts: a "pulse shaper" which is a preamplifier with band filter, matched filter, high pass/low pass filter or alike that enhances the photon pulse compared to spurious signals, and a self-triggered or bi-stable comparator (discriminator). Both functions can be combined in one circuit, so that the above circuits do not necessarily comprise two subcircuits.

if it is desired to introduce amplitude discrimination, multiple such comparators may be provided that trigger at different amplitudes.

With a properly designed front end, one may get rid of image lag or detector decay effects, meaning that it is possible to count faster than the decay time if the pulses stand out sufficiently long. Yet, this is not obvious if one aims to realize color X-ray at the same time, and it is not desired to have incomplete information per pulse.

In accordance with embodiments of the present invention, many circuit variants and alternatives can be envisaged. Tradeoff could take into account one or more of the following: compactness, scalability, noise floor, uniformity, suitable for multiple (programmable) level comparator, low power.

An implementation of a RC CTIA (capacitive//resistive feedback charge transimpedance amplifier) and a continuous time comparator according to embodiments of the present invention is illustrated in FIG. 18. The positive feedback via capacitor $C_C$ makes the comparator unambiguous. The RC CTIA 180 of FIG. 18 comprises two inverting amplifiers 181, 182 of which the first is a CTIA (charge transimpedance amplifier), consisting of an inverting amplifier and a capacitor C1 in the feedback loop, and the second acts as an OTA (operational transimpedance amplifier) whose rather large output resistance R1 acts as a resistive feedback when connected to the detector node, e.g. photoreceptor node 183. The RC CTIA 180 is coupled to a comparator 184. The coupling to the comparator 184 is performed in the embodiment illustrated as an AC coupling through a coupling capacitor C2, which has the advantage to remove DC offset and offset non-uniformity that may be residual on the CTIA 180. The AC coupling also has a high-pass filtering effect, so as to realize a band pass filter which is suitable for pulse amplification. This particular comparator 184 illustrated comprises a series of 3 inverting amplifiers 185, 186, 187 coupled in series. The first inverting amplifier 185 acts as a thru inverting amplifier with a capacitor C3 in its feedback loop, amplifying the pulse obtained from the CTIA 180. The second amplifier 186 is a OTA, giving resistive feedback to the comparator input 188 via its internal resistance R2, thus stabilizing around a predetermined threshold. The $3^{rd}$ amplifier 187 further amplifies the pulse, and gives via a capacitor $C_C$ a positive feedback to the comparator input 188, thus creating a kind of bi-stability to create unambiguous digital pulses.

Apart from being a very simple implementation, this scheme has limitations for the application as it has a rather low open loop gain, and it suffers from non-uniformity. An alternative embodiment is illustrated in FIG. 19, showing an RC CTIA 190 coupled in series with a comparator 191 over a decoupling capacitor $C_D$. Here the RC STIA 190 and the comparator 191 are provided with real (rather than parasitic) resistive "R" (resistor) elements in the feedback instead of the OTAs of FIG. 18. Although this scheme is more familiar for the average person skilled in electronics than FIG. 18, it has the problem that the required resistor values, which are in the order of MegOhms, are difficult to implement in standard CMOS technologies.

One way to implement resistor-like devices in such circuit is shown in the possible variant of FIG. 19 as illustrated in FIG. 20, where the feedback resistor is implemented as a MOSFET.

In the above embodiments of pulse shapers, the feedback resistors can be implemented as linear resistors or as non-linear resistors (such a MOSFETs, diodes . . . ).

The inverting amplifiers in the schematics are show here as class A amplifiers. It is clear for a person skilled in the art that many types of amplifiers can be envisaged her: single ended, double ended, single stage, multiple stage, high/low/band pass filtered, OTA, OPAMP, Based on MOSFETs or on other types of transistors or amplifying devices, etc Now turning back to FIG. 4A and FIG. 4B, the pulses of the pulse train 46 produced by the comparator 45 indicate that the signal is in the desired range of energies. These pulses trigger the counter (digital) or accumulator (analog) 47 that increases its value. The pulses in the pulse train 46 are thus counted by means of a counter or accumulator 47 in order to provide a count value 48 for the number of impinging incident photons 41. In accordance with embodiments of the present invention, the counter or accumulator 47 may be an analog accumulator or a digital counter.

In accordance with a particularly advantageous embodiment of the present invention, a non-linear analog accumulator 47 may be used. The accumulator 47 may deliberately be made non-linear in the sense and with the purpose, that the analog output signal step height decreases as the number of accumulated counts increases.

A first advantage of such a non-linear analog photon accumulator is that the range of counts that can be usefully read out is much higher than with a linear accumulator, even when the step height at low count values is the same.

A second advantage is that the analog output signal increment is better matched with the inherent noise and the read noise associated with such analog signal creation and readout. This method is allowed and is beneficial, as in a linear accumulator, the noise (uncertainty on the number of counts) grows as the number of counts grows (namely, this noise is the X-ray photon shot noise, which is equal to the square root of the number of counts). Thus, if the analog readout chain is made capable to readout the smallest steps at low counts accurately, then at high counts the noise exceeds this accuracy manifolds. In an adequate non-linear system, the step height can be reduced for higher counts, as one does not need to readout to an accuracy of the step height, yet to the accuracy of sqrt(counts)*step_height. Thus a significantly higher dynamic range is realized, the dynamic range being the ratio of the smallest and largest count being read accurately. This means that, in accordance with embodiments of the present invention, the accuracy is limited by the X-photon shot noise and not by the analog circuit noise.

In the embodiment illustrated in FIG. 4A, the analog accumulator 47 comprises an input port 50 for receiving the generated binary pulse train 46. The counter or accumulator 47 comprises an analog memory element, e.g. counting capacitor Cs, for storing a value representative of the counted number of pulses in the pulse train 46, which corresponds to the number of impinging photons. The memory element, e.g. counting capacitor Cs, is connected to a reset system 51 for resetting the memory element, e.g. counting capacitor Cs, to an initial value. The reset system 51 may comprise a first voltage source (not illustrated) for delivering an electrical reset signal, e.g. a reset voltage DC2, and a reset switch 52 for connecting the reset signal to the memory element, e.g. counting capacitor Cs. The reset voltage DC2 may for example be a ground or supply voltage, being the initial voltage equivalent to count zero.

The analog memory element, e.g. counting capacitor Cs, is injected with a charge packet. This charge packet is created by a charge packet source, e.g. a circuit comprising a switch 54, a charge packet supply and a charge packet source memory element, e.g. capacitor Cp. A first switch 53 is provided between the analog memory element, e.g. counting capacitor Cs, and this charge packet source. The charge packet source memory element, e.g. capacitor Cp, is connected to the charge packet supply, e.g. a second voltage source, (not illustrated) for delivering an electrical charge signal, e.g. a voltage DC1, over the second switch 54. The first switch 53 and the second switch 54 are oppositely operated, i.e. the one is opened when the other one is closed and vice versa. The opening and closing of the first switch 53 and second switch 54 is determined by the value of the pulse train signal 46 at the input port 50.

After reset of the analog memory element, e.g. counting capacitor Cs, when a first high pulse 46 arrives at the input port 50, the second switch 54 is closed, thus connecting the charge packet source, e.g. the charge packet memory element thereof, such as second capacitor Cp, to the electrical charge signal DC1, and thus charging the charge packet memory element, e.g. capacitor Cp. When the high pulse has passed, and the signal in the pulse train 46 goes back to low, the second switch 54 opens, thus disconnecting the charge packet memory element, e.g. capacitor Cp, from the electrical charge signal DC1, and the first switch 53 closes, thus connecting the charge packet memory element, e.g. capacitor Cp, and the analog memory element, e.g. counting capacitor Cs, in parallel. The charge packet size that is thus transferred from the charge packet memory element, e.g. capacitor Cp, to the analog memory element, e.g. counting capacitor Cs, is proportional to the difference between the actual voltage on the analog memory element, e.g. counting capacitor Cs, and the charge packet supply voltage DC1. Initially this difference is equal to DC2-DC1, but as the charge accumulates on the counting capacitor Cs, this difference gradually decreases as a decaying exponential function (V~1−exp(−constant*counts)).

This way, with every new pulse in the pulse train 46, the signal on the analog memory element, e.g. counting capacitor Cs, is increased; however, in a non-linear way. By thus counting in a non-linear way, for every further photon detected, the increment in the count signal is smaller.

In the above-described analog accumulator 47 the ratio of the capacitance values of the capacitors Cp/Cs determines the initial step height of the analog counting signal. If Cp or Cs are programmable, and/or DC1 and DC2, the initial step height can be programmed.

The output port of the analog accumulator 47 may be coupled to a memory (not illustrated in the drawings), such as for example an analog memory, which may be part of a sample and hold stage, so that the count value 48 may be stored for later readout or processing.

FIG. 4B shows another implementation of an analog accumulator which may be used in particular embodiments of the present invention, and that realizes an approximate square root law. This is realized by a charge transimpedance amplifier (CTIA) which has a non-linear capacitor (such as a "varactor") in the feedback loop (illustrated by a diode symbol), the non-linear capacitor having an approximately square or square root relation between its capacitance and bias voltage.

The analog memory element, e.g. non-linear counting capacitor Cs, is injected with a charge packet. This charge packet is created by a charge packet source, e.g. a circuit comprising a switch 54, a charge packet supply and a charge packet source memory element, e.g. capacitor Cp. A first switch 53 is provided between the analog memory element, e.g. counting capacitor Cs, and this charge packet source. The charge packet source memory element, e.g. capacitor Cp, is connected to the charge packet supply, e.g. a voltage source, (not illustrated) for delivering an electrical charge signal, e.g. a voltage DC2, over the second switch 54. The first switch 53 and the second switch 54 are oppositely operated, i.e. the one is opened when the other one is closed and vice versa. The opening and closing of the first switch 53 and second switch 54 is determined by the value of the pulse train signal 46 at the input port 50.

Upon reception, by the analog accumulator 47, of a high pulse of the pulse train 46, switch 54 closes and a charge packet is stored on the charge packet source memory element, e.g. capacitor Cp. Upon opening of the switch 54 and closing of the switch 53, the charge packet is transferred to the non-linear counting capacitor Cs.

The voltage DC1 and the voltage DC2 of the charge packet source need to be properly adjusted to obtain a good non-linear law. The non-linearity of the analog accumulator can be tuned by changing the difference between DC1 and DC2.

Figure 5:
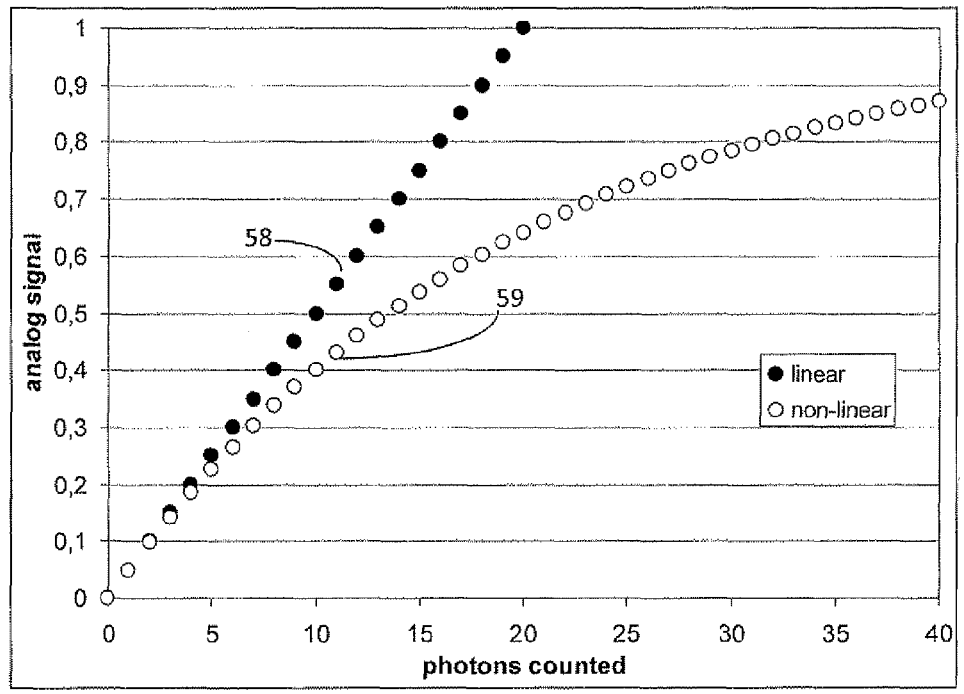

FIG. 5 shows an example of an analog accumulated signal in case of a photon counting pixel with linear analog accumulator (graph 58) and in case of a photon counting pixel with non-linear analog accumulator (graph 59). The Y-axis shows the analog count signal referred to the initial or "reset" value of the capacitor Cs. The X-axis shows the number of photons detected and thus counted. The graph 58 represented by the black symbols show a linear response as in the prior art, with a step height of 0.05 V for every detected photon, and saturating at 1.0 V. It can be seen that maximum twenty photons can be detected, after which the detector saturates. The graph 59 represented by the white symbols show a non-linear response for a particular case, initially having a same step height of 0.05 V, whereby the step height gradually decreases as the analog signal stored on the first memory element, e.g. capacitor Cs, increases. The non-linear response according to embodiments of the present invention, although making a quantitative interpretation of the count more cumbersome (even though calibration is straightforward), has the advantage that the analog signal does not saturate as easily: it allows to record "highlights" or over-illuminated parts in the image, thereby extending the dynamic range, defined as the maximum photon count at saturation divided by the initial count step, far beyond the dynamic range of a linear analog accumulator.

Digital counters have an unlimited dynamic range (signal to noise ratio), at least, this range is limited only by the number of bits in the counter. In analog domain a signal cannot have an unlimited S/N ratio, as analog components suffer from electronic device noise and environment noise.

Yet, one can with embodiments of the present invention extend the dynamic range easily beyond the S/N of one analog accumulator, by putting several analog accumulators in parallel, and giving each a different step height. The lower signal range will be covered by the high step height accumulator, the higher signal range will be covered by the lower step height accumulators.

Figure 7A:
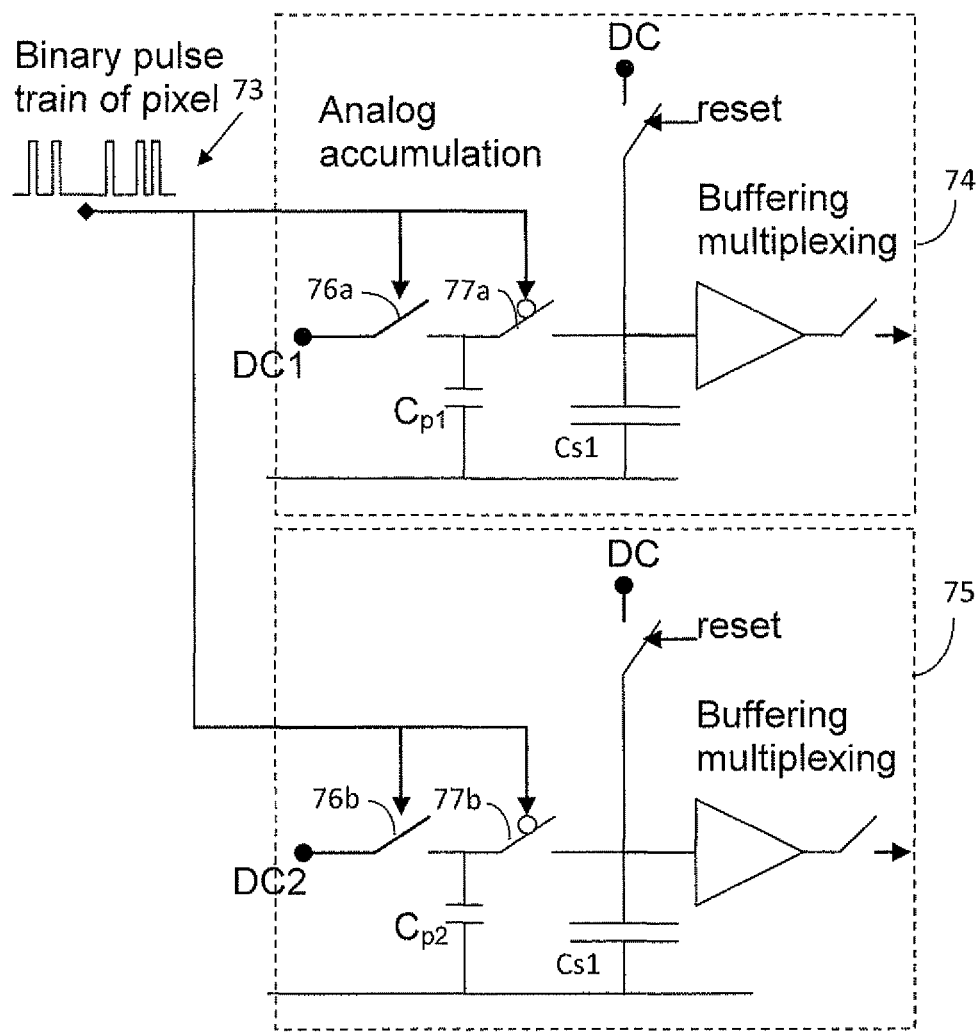
FIG. 7A is an example of how a same pulse train can be accumulated in two analog accumulators that each have different step height and/or analog range, which is programmed in the example illustrated by having different capacitance values for Cp1 and Cp2 and different voltage values for DC1 and DC2.

This is, as an example only, illustrated in FIG. 7A. A pixel comprises a radiation receptor (not illustrated) for receiving radiation or high energy particles and converting them into a radiation signal, a comparator for converting the radiation signal into a pulse train 73, and a plurality of analog accumulators 74, 75 for accumulating the first pulse train 73 to a plurality of analog signals for readout. Each of the accumulators 74, 75, in the embodiment illustrated, comprises a charge packet source, comprising a charge packet memory element Cp1, Cp2, respectively, a first switch 76a, 76b, respectively, and a charge packet supply, e.g. a voltage source, (not illustrated) for delivering an electrical charge signal, e.g. a voltage DC1, DC2, respectively, over the switch 76a, 76b. The charge packet source is coupled over a second switch 77a, 77b, respectively, to the counting capacitor Cs1, Cs2, respectively. The first switch 76a, 76b, respectively, and the second switch 77a, 77b, respectively, are oppositely operated, i.e. the one is opened when the other one is closed and vice versa. The opening and closing of the first switch 76a, 76b, respectively, and the second switch 77a, 77b, respectively, is determined by the value of the pulse train signal 46 at the input port.

Every time a high pulse is present in the pulse train 73, the accumulated charge on the memory elements, e.g. storing capacitors Cs1 and Cs2, increases with a value dependent on the respective charge packet sources, more particularly in the embodiment illustrated the charge packet supplies DC1, DC2, respectively, and the capacitances of the charge packet memory elements Cp1, Cp2, respectively.

In alternative embodiments of the present invention, a plurality of accumulators may be provided, which each are capable and set up for receiving pulses of a pulse train emanating from one pixel as in the schematic illustration of FIG. 7A, or emanating from a plurality of pixels. The accumulators may be adapted for alternatingly accumulating a pulse train, e.g. parts of a pulse train if the at least two accumulators receive a same pulse train, so that at least one accumulator is set up for accumulating while at least one other accumulator is available for readout. A controller may be provided for controlling at any moment in time which one(s) of the plurality of accumulators perform(s) accumulation, and which one(s) is (are) available for readout.

The non-linearity that is produced by the implementation of the analog accumulator as illustrated in FIG. 4A is an exponential function (1−exp(−constant*counts)), as also illustrated in FIG. 5. This is a useful function, as it keeps a finite S/N ratio over a very wide dynamic range of counted values (in the example illustrated up to more than 40 photons counted).

An alternative non-linear function is the square root function, which has, in the presence of sole photon shot noise, a constant equivalent analog noise. Such square root function may for example be obtained with embodiments of circuits as illustrated in FIG. 4B.

Figure 6:
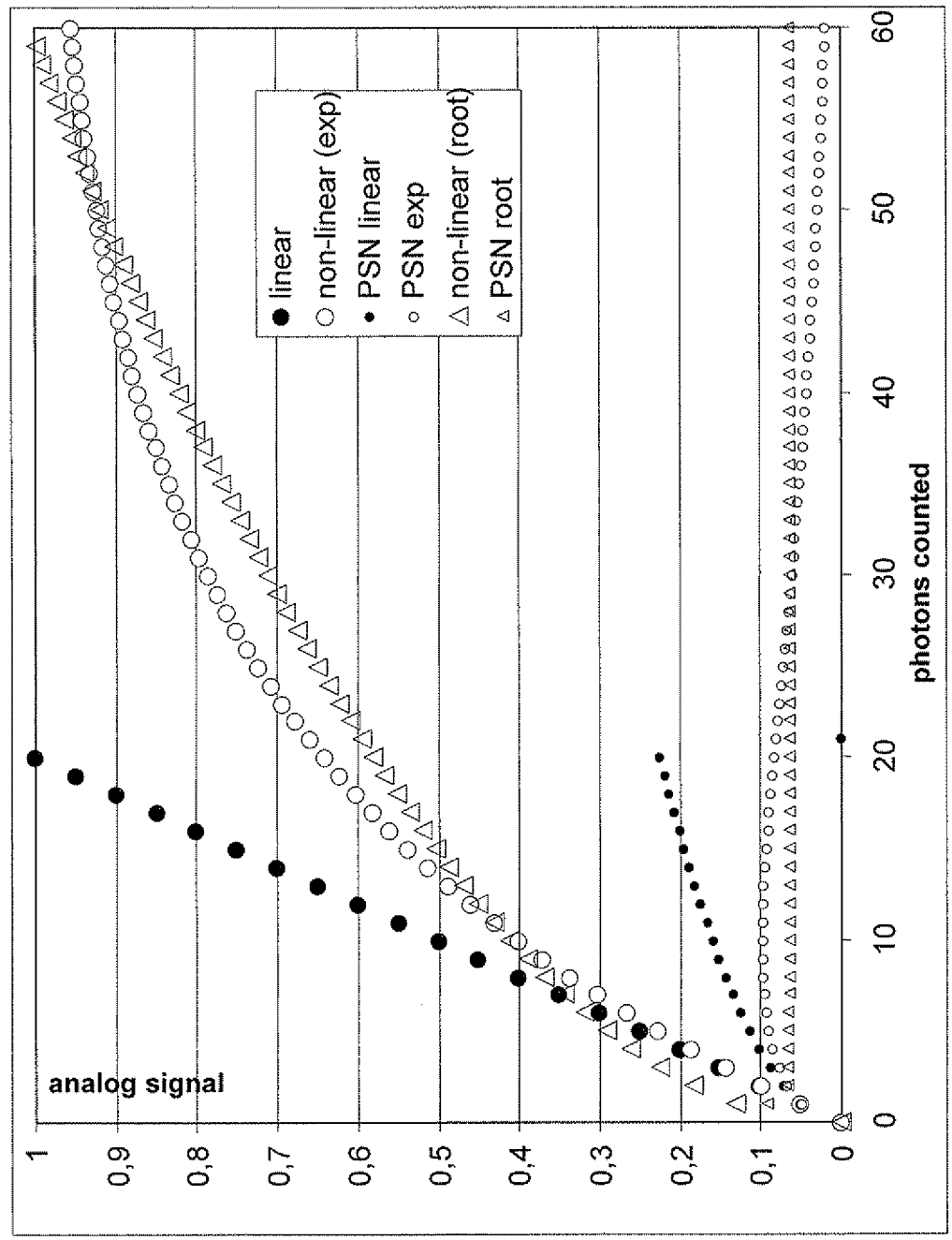

Both non-linear laws and their equivalent analog read noise are illustrated in FIG. 6. The graphs represented by the large signals illustrate a linear law (●), a non-linear exponential law (○) and a non-linear square root law (Δ) for an analog accumulator. The graphs represented by the small symbols illustrate the equivalent noise on the analog Y-scale that corresponds to the photon shot noise (PSN) of the number of counted photons: PSN for the linear law (•) for the non-linear exponential law (○) and for the non-linear square root law (Δ). It is to be observed that the non-linear laws, especially the square root law, have a quite constant noise over a much wider dynamic range compared to the linear accumulator.

According to further embodiments of the present invention, analog operators may act upon one or more pulse trains. In embodiments of the present invention the analog operator may act upon the signal that comes from one or more pulse shapers 44, after which the result of such analog operator may be fed to one or more comparators 45. In accordance with embodiments of the present invention, an analog operator may act on signals of a group of pixels. Analog operators may for example, but not limited thereto, be differencing, maximum or minimum operations, integration, differentiation, coincidence detection, etc.

Figure 7B:
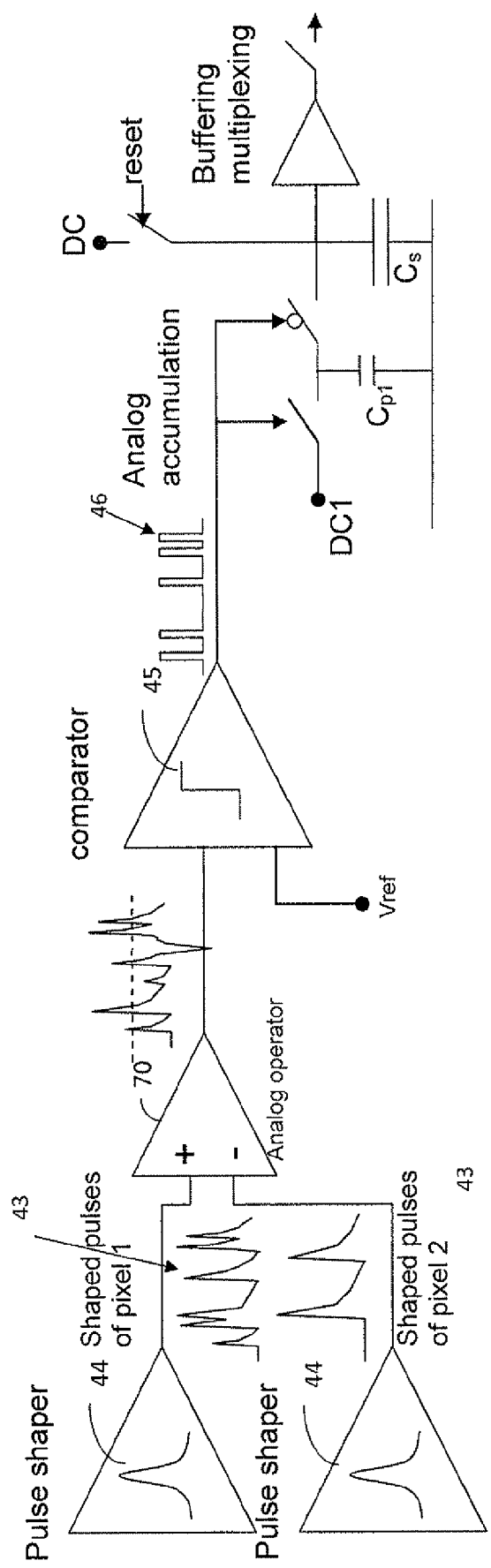
FIG. 7B is an example of how an analog operation is carried out on the signal of two pixels before the comparator.

FIG. 7B illustrates one embodiment where the analog operator is a differencing operator 70, that effectively inhibits the propagation of the signal of a first pixel if a pulse coincides with a pulse of a second pixel. Both pixels comprise a radiation detector (not illustrated) for receiving radiation or high energy particles and converting them into a radiation signal. In the embodiment illustrated, the radiation signal of each pixel is applied to a pulse shaper circuit 44 for shaping the radiation signal into analog electrical pulses 43. An analog operator 70, being a differencing circuit in the example illustrated, makes a difference of the two shaped radiation signals. This difference signal is then fed to a comparator 45, which is a comparator common to the first and the second pixel, where the difference signal is compared to a reference signal, and every time a relevant parameter of the difference signal, e.g. amplitude, area, width or length, equals a corresponding parameter in the reference signal, a first value, for example high or digital one, is assigned to the output signal of the comparator 45, and every time the pulses of the difference signal exceed the reference value in positive or negative direction, a second value, for example low or digital zero, is assigned to the output signal of the comparator 45. This way, he output of the comparator 45 is a pulse train 46 in the form of a binary signal. According to embodiments of the present invention, this pulse train is applied to an counter or accumulator, for example a non-linear analog accumulator.

According to further embodiments of the present invention, a pixel may be provided with a counter or accumulator that performs a logic operation of the pixels which it counts and its neighbors. The counter or accumulator may be an analog accumulator or a digital counter. An analog accumulator may be a linear or a non-linear accumulator. The counter or accumulator may for example compare the pulse amplitude of coinciding pulses of neighboring pixels, and may suppress the pulse if the pulse of at least one neighboring pixel is larger. For that purpose a circuit may be provided that compares the pulse height of the involved pixel and its neighbors. Such comparators may be of various nature known to people skilled in the art. According to other embodiments, other analog operations may be carried out for pulses coinciding in time on pixels in a predetermined neighborhood, such as comparison of pulse arrival time, pulse duration time, pulse rise and fall time or integral of pulse over time. Pulses that are compared negatively for the same one or more criteria versus the corresponding pulses (i.e. pulses coinciding in time) in a neighboring pixel may be suppressed. Such comparison and suppression has as effect that a pulse that is spread out over multiple pixels is only counted in its maximum, thus improving the sharpness of the image. Many different types of combinations of criteria can be envisaged in accordance with embodiments of the present invention. It is likely and clear for people skilled in the domain of particle and light detection that decision algorithms may act upon one or a few (analog or logic) operators on one or more pixel values in a smaller or larger neighborhood, all information being available at the same time or available over a longer or shorter time period, even including global or remote imager or pixels readings; whereby the decision criteria may be purely deterministic, or subject to redundancy to allow some criteria to be fuzzy or incompletely met.

This is illustrated in FIG. 8. In this example, the secondary light (pixel signal), which is a light flash emitted by the absorption of an X-ray photon 80 in a scintillator 81, is smeared out over several neighboring pixels. The operator "is larger than its neighbors" will, however, result in a "yes" for the most central pixel(s) only, as illustrated in the bottom of FIG. 8.

Embodiments of the present invention work further on FIG. 8 hereinabove.

In accordance with embodiments of the present invention, methods are provided to realize coincidence detection in direct or indirect X-ray detector arrays. This coincidence detection may be used to enhance the image sharpness.

In X-ray imaging devices, recovering the accumulated charge as such is in most cases not of first interest. However, it is of interest for color X-ray. "Color x-ray" are "x-ray images created from X-ray (illumination or recording) with two or more energy bands". Moverover, there is an added value in the recovery of the loss of image sharpness that occurs due to the fact that the visible light flash caused by an X-photon 80 in a scintillator 81 spreads over multiple pixels (FIG. 8). A similar (however typically lesser) unsharpness occurs due the spread of a charge cloud in direct detectors.

Essentially an image can be made sharper if one individually detects and classifies each X-ray photon or light spot or generated charge packet or cloud and records its position in the pixel of the center or maximum of the detection. The smear out, e.g. the detection signals generated in other pixels different from the pixel of the center or maximum of detection, due to optical or physical effects may thus be cancelled to a large extent.

The application domains are various, including but not limited to X-ray imaging, CT (computed tomography), conebeam CT, neutron imaging, gamma imaging, imaging using photon detection as with APD's (avalanche photodiodes), imaging using short light pulse detection such as in laser ranging, scientific imaging (imaging used in several scientific applications), particle detection, medical imaging, material science, security scanning, space imaging, acoustic imaging where the pressure signal is emitted and received in short pulses. In fact embodiments of the present invention may apply to all imaging where the radiation comes confined in space, e.g. where the radiation forms a radiation spot on an imager or pixel array.

FIG. 9 illustrates time traces for a situation with three neighboring pixels. Each pixel delivers a series of pulses, e.g. due to X-ray photons scintillating. The pulses of any pixel arrive randomly in time, in view of the impinging X-ray photons and the scintillation, Pulses may be generated at the same time in different pixels, due to a signal smearing out over different pixels. Different situations are labeled A,B,C in FIG. 9. In cases labeled A and C, charge generated by an impinging X-ray photon is shared (smeared out) amongst multiple pixels. Different sharpness recovery algorithms are possible according to embodiments of the present invention.

In cases A, pulses coincide in different pixels. In such situation, in order to increase sharpness, a sharpness recovery algorithm can be implemented for example such that pixels with the largest pulse prevail, as also illustrated in FIG. 8. In case B, pulses in neighboring pixels do not occur at exactly the same moment, and should not be treated as one event. Case C shows another ambiguity: if two coinciding pulses are exactly equal in size, an arbitration circuit could choose to which pixel to allocate the pulse. In alternative embodiments, a centroiding algorithm may be implemented. In a centroiding approach, the center of the impinging electromagnetic radiation or cloud of high energy particles (thus the likely position of the original photon) is derived from fitting a Gauss curve to the observed signal spread over multiple pixels. The center (mean) of the Gauss curve is known with greater accuracy than the pixel pitch. Several variants of centroiding (also sometimes called "super resolution") are known to the person skilled in the art and not explained here.

The sharpening operation according to embodiments of the present invention may act in various representations of the signal as it progresses through the pixel.

In a first embodiment, the sharpening operation, i.e. suppressing signals in some of the pixels of a neighborhood, may be performed on the photoreceptor signal itself (=on photo charge or photocurrent) as illustrated in FIG. 10. This drawing illustrates two pixels 100, 101 of an array of pixels. Embodiments of the present invention are, however, not limited to a neighborhood of only two pixels; two pixels only are illustrated for reasons of clarity. Each pixel 100, 101 comprises a radiation receptor 42, e.g. phototransducer 42 (such as for example photodiode, PIN diodes, photoresistors, wire chambers, dynodes, photomultipliers, micro channel plates, avalanche photodiodes, monolithic or hybrid, for converting the electromagnetic radiation (such as for example X-rays or visible light) or impinging high energy particles 41 (such as for example alpha and beta radiation, electron beam, and subnuclear particles) into a first radiation signal 102. The impinging radiation may be single photons, but also short flashes with more than one photon, such as laser pulses or laser flashes, or packets of more than one particle of said particle radiation. The radiation receptor may be a direct detector or an indirect detector. An indirect detector detects the radiation in combination with a conversion medium or layer that converts the radiation to an electromagnetic (not necessarily visible light) flash, which is subsequently detected by any of the above radiation receptors.

The generated first radiation signal 102 comprises small charge packets with hundreds of electrons, which are shaped to analog electrical pulses 43 by a pulse shaper circuit 44. A comparator 45 compares the generated analog pulses 43 to a reference signal $V_{ref}$. The comparator 45 may have an adjustable threshold determining the reference signal $V_{ref}$: this allows separating the noise from the useful signal, and recognizing the energy of the electromagnetic radiation or impinging high energy particles 41. in the comparator 45, the analog signal is converted into a digital signal. Every time a relevant parameter, such as e.g. the amplitude, area, width or length, of the pulses 43 exceeds a corresponding parameter in the reference signal $V_{ref}$, a first value, for example high or digital one, is assigned to the output signal of the comparator 45, and every time the analog pulses 43 are below the reference value $V_{ref}$, a second value, for example low or digital zero, is assigned to the output signal of the comparator 45. This way, a binary signal is made, comprising a digital pulse train 46. The pulses of the pulse train 46 produced by the comparator 45 indicate that the signal is in the desired range of energies. These pulses trigger the counter (digital) or accumulator (analog) 47 that increases its value. The pulses in the pulse train 46 are thus counted by means of a counter or accumulator 47 in order to provide a count value 48 for the number of impinging incident photons 41. In accordance with embodiments of the present invention, the counter or accumulator 47 may be an analog accumulator or a digital counter.

As illustrated in FIG. 10, feedback connections 103 are made from the output of the pulse shaper 44 of the first pixel 100 of the array to the input of the pulse shaper 44 of the second pixel 101 of the array, and from the output of the pulse shaper 44 of the second pixel 101 of the array to the input of the pulse shaper 44 of the first pixel 100 of the array. Feedback impedances 104 are provided in the feedback connections 103. The feedback impedances 104 in this scheme may be linear or non-linear passive components (R, L, C), or active elements as MOSFETs used as approximation of R or C. Particular embodiments of the present invention comprise variable impedances 104. A pulse in a particular pixel suppresses or modifies via a cross-feedback impedance 104 the charge detection of a neighboring pixel. A pulse in a particular pixel generates an increasing signal at the input of the pulse shaper 44. This corresponds to a decreasing signal at the output of the pulse shaper 44. By feeding back the decreasing signal at the output of the pulse shaper 44 to the input of neighboring pixels, the charge detection at neighboring pixels is counter-acted.

In a second embodiment, the sharpening operation, i.e. suppressing signals in some of the pixels of a neighborhood, may be performed in the analog pulse domain, i.e. on the resulting signal from the pulse shaper 44. Components illustrated in FIG. 11 which are as in FIG. 10 are not discussed here again. The analog domain pulses 43 on which the sharpening operation is performed in this case have analog wave forms, with maybe different amplitude, start/end time, duration, rise time, fall time, integral, sharpness or maximum.

In the embodiment illustrated in FIG. 11, a "winner-take-all" circuit 110 (WTA) is implemented, as also disclosed by J. Lazzaro et al. in "Winner-take-all networks of O(n) Complexity", Advances in neural information processing systems, D. S. Touretzky Ed., Vol. 2, pp. 703-711, Morgan Kaufmann, San Mateo, Calif., 1989, or by Minglian Liu in "CMOS winner-take-all circuits: a tutorial", EDN Jun. 26, 2007, http://www.edn.com/article/CA6454765.html#ref. Both documents are incorporated herein by reference. The WTA circuit 110 of a pixel only propagates the pulse of this pixel if it is larger than the pulses of its neighbors. FIG. 11 shows each pixel connected to only two neighbors. It is clear for a person skilled in the art that in real circuits pixels can be connected in any direction with neighbors and neighbors of neighbors. FIG. 11 suggest that the WTA circuit 110 can be combined into one circuit with the comparator 47, or remain separate.

In embodiments of the present invention, the WTA is a "compromised WTA", i.e. it acts only in a local neighborhood around the pixels and not on the whole image sensor. This is realized by choking the feedback from pixels further away, or by implementing interconnection trees that are local. There is little operational difference between such WTA and a local maximum detector circuit.

A practical implementation of a "Winner takes all" circuit is that the largest "analog domain pulse" in a neighborhood of a pixels wins.

In a third embodiment, the sharpening operation, i.e. suppressing signals in some of the pixels of a neighborhood, may be performed on the result of the comparator 45, as illustrated in FIG. 12, i.e. on the digital pulse train 46. Components illustrated in FIG. 12 which are as in FIG. 10 are not discussed here again. The digital domain pulses forming the pulse train 46 have all the same amplitude but may differ in start/end time and/or duration.

The embodiment illustrated in FIG. 12 comprises a variant of WTA: a "First-Takes-all" (FTA) circuit 120: the pulse that comes first suppresses its neighbors. This implementation assumes that the strongest analog pulse propagates first. In fact, the combination of the comparator pulse and the FTA acts effectively as a WTA, and can be considered as a particular implementation of a WTA.

A practical implementation of "First takes all" is that the digital pulse that comes first in a neighborhood wins.

In a fourth embodiment, which is a generic approach to the previous 3 embodiments, spatio-temporal filtering may be used. This means that a pixel's signal, at the pulse shaper 44, or before or after the comparators 45 may be replaced or adjusted by an operator or set of operators applied to multiple pixels in a neighborhood (and even outside the neighborhood, such as remote reference detectors), and over time. In one embodiment, the filtering may be linear filtering, such as for example differencing or linear combination. In an alternative embodiment, the filtering may be non-linear filtering, such as for example maximum detection. It is to be noted that the shown embodiments are also spatiotemporal filters: the WTA is a special case of a maximum detector applied on multiple pixel signals. The FTA is a non-linear spatio-temporal filter.

The feedback implementation, the winner-take-all implementation, the first-take-all implementation and the filtering implementation can all be implemented in the charge domain, the analog pulse domain and the digital pulse domain.

Alternatives to the above implementations that are provided according to embodiments of the present invention are implementations where the pulse with the longest duration prevails, or the steepest rise time, or the longest decay time, etc. In yet other alternative embodiments, circuits as indicated above may be used, but wherever "maximum" or "winner" is said, an equivalent function with "minimum" (inverse polarization) can be thought that has the same final functionality).

The performance advantage of a sharpening operation in accordance with embodiments of the present invention can be modeled as an MTF (Modulation transfer function) improvement as in FIG. 13. MTF is a generally used measure for effective sharpness of an image or imager. In FIG. 13, it is shown that, even with the same pixel size and pitch, blurring creates a significant decrease in MTF (compare graphs 130-134). One can easily understand that in the limit, when for each individual light flash only the pixels where the flash maximum falls are fired, that this corresponds to ideally delineated pixels, which have the MTF labeled "ideal (Sync)" in FIG. 13. It may thus be silently assumed that the flash maximum is identical to point of photo conversion of the original X-photon.

It is a further embodiment of the present invention to provide a compact elegant implementation of the FTA circuit as for example used in the embodiment illustrated in FIG. 12, with NAND gates. Such compact implementation of the FTA is the circuit is illustrated in FIG. 14. It is clear for a person skilled in the art that equivalent circuits can be designed with inverted 1s or 0s without departing from the teaching of the present invention.

The FTA circuit illustrated in FIG. 14(A) is drawn in one dimension, acting on a first neighbor. In alternative embodiments, the FTA circuit may act in a two-dimensional image plane or in a three-dimensional voxel space. In the above or other embodiments, the FTA may act on further neighbors than only the first one. In particular, the FTA may also act on diagonal neighbors.

The NAND gates may be implemented with asymmetric speed to avoid glitches due to non-uniformity, as illustrated in FIG. 14(B).

FIG. 15 shows an implementation of a sharpening circuit according to embodiments of the present invention with a "local maximum" detector instead of a WTA. The local maximum detector can be a simple maximum detector as illustrated in FIG. 15(c) which circuit comprises a differential amplifier that compares the voltage A with the voltages B, C, D, and yields a high output signal when A is larger than all of B C and D. Alternatively, the local maximum detector may be a differential maximum detector combined with a bi-stable comparator as illustrated in FIG. 15(d), which is the circuit of FIG. 15(c) combined with the core part of a continuous time bistable comparator.

In a further embodiment of the present invention, when performing a sharpening operation not only the pixel with the largest pulse wins, but also a technique as "centroiding" or "super resolution" is used, to determine the position of the center of gravity of the light flash (charge packet) with higher accuracy than the pixel resolution. The centre of gravity is determined over a group or neighborhood of pixels, a centroid (Gaussian fit) is applied to it, and the centre (mean of the Gaussian fit) is taken as the position of the impinging pulse. The result is expressed as a center position (X,Y) (which may thus be of finer resolution as the pixels pitch) and a spread ("sigma", standard deviation, RMS) in X and Y (sigmaX and sigmaY; in particular embodiments sigmaX and sigmaY may be the same). Alternatives to the spread are the FWHM (full width half maximum) or the 1%, 10%, 25% etc percentiles etc.

The result is encoded and counted in multiple counters (digital) or accumulators (analog) in the pixel, or can be directly processed in digital or analog signal processing. One may thus have pixels with a single large radiation detection element, e.g. diode, and multiple counters or accumulators (for example 2×2 but maybe much more, say, 10×10). This makes sense as one will find that such accumulators may be made small in size and may be built on, say, 10 μm pitch, whereas the direct or indirect detectors (diodes, scintillator pixels) are at least a factor 3 larger, e.g. are about 50 μm large.

In embodiments of the present invention, the result may be sent out immediately—this looks like event driven sparse imaging, similar to what is described in U.S. Pat. No. 5,010, 245. In alternative embodiments, the result may be stored in a small register list in the pixel, for later readout.

The results are accumulated in one total value per pixel (this is the pixel in which the (X,Y) position of the maximum falls) and while doing so, one [weighted~] averages all (X,Y) positions, which also has an according overall position spread (sigma2X,sigma2Y). These four values (X, Y, sigma2X, sigma2Y) (or three if sigma2X is assumed equal to sigma2Y) are accumulated in digital or analog domain and issued as four (three) values at the time of readout. Having this information per pixel allows to reconstruct the image with sub-pixel accurate sharpness information.

FIG. 16 is a representation to show what could be the result if each pixel accumulates the number of photon counts (as a value), their averaged position (shown as spot within the pixel) and their spread in X and Y (shape of the ellipse). From this information, a sharper image than the classical pixel resolution (pixel grid) can be reconstructed. The left hand side of FIG. 16 illustrates some arbitrary object indications where light falls on a 5×5 pixel array. The right hand side illustrates the case where each pixel has counted photons, and recorded their average position and spread around that position. It is clear that this extra pixel information may serve to display an image that has detail on finer scale than the pixel grid, and thus a more accurate representation of the light pattern.

This goes beyond the present notion of superresolution. Present centroiding or superresolution acts on a fully acquired image, where the signal of each pixel is the results of a large number of photons. Here we obtain the higher resolution by detecting the positions of each photon individually.

It may realize images that have finer detail than the pixel pitch.

It may realize imaging that beats (cancels) unsharpness of various kind. It may for example be implemented in X-ray imaging, as one important application domain, or in visible light imaging, if the radiation is confined in packets in space and time.

This may be implemented as follows: when for coinciding pulses in neighboring pixels, pixels are inhibited to fire because their pulse is smaller than the neighbor's, its pulse value should be recorded and forwarded to the neighbor that has the higher value.

Pixels may receive such values from neighbors, and should sum all received signals, including their own signal, and pass it to the strongest neighbor if the pixel itself has not the strongest pulse, or retain its value for subsequent pulse amplitude classification, if the pixel is the local maximum (or contains the center of gravity of the flash) itself.

Circuit implementations are not given here. One possible path to go is to use voltage summing amplifiers (amplifier with C in feedback), driven by switches dependent on the WTA/FTA; or based on current mirrors to sum signal levels, also dependent on switches driven by the WTA/FTA.

In a further embodiment, the present invention provides a method to improve the yield of arrays of pixels. A pixel is considered a as a little black box, with a limited number of IO, that is typically accesses and addressed line-wise or column-wise. Considering that process faults, e.g. CMOS process faults do occur, such as for example but not limited to open circuits, short circuits and deviating device parameters, it is desired to limit the proliferation of the occurrence of such fault. As an example only, a power supply short between VDD and GND inside a pixel will typically (but not necessarily) make that pixel fail; however, it should not make neighbor pixels fail. Similarly, a defective pixel could make a row or column fail but should certainly not make the whole array fail.

Embodiments of the present invention include that some or all of the local (local to the pixel) supplies (VDD, VSS, GND) are connected to their corresponding rail/bus via a local resistor (typically one will not do this for a GND which is tied to substrate). A short circuit drawing large current will thus not jeopardize the supply voltages for other pixels as the voltage drop is confined to the local resistor.

Similar measures can apply to all or part of the input signals to the pixel. They may be locally separated from the rail/bus via a resistor.

These resistors may be classical linear resistors; yet it may be even better to have a non-linear resistor that has a better compromise in low resistance when the pixel is OK, and increased resistance when the pixel has a short circuit. In yet alternative embodiments, fuse-like implementations may be used.

For the pixel's output signals, which are typically multiplexed, the usual multiplexing of all pixel signals to a column wise or row wise or more generic output common bus/rail via MOSFET switches or other methods known to people skilled in the art may be used. Yet, in accordance with embodiments of the present invention, it may be avoided that the signals commanding this multiplexing are generated from inside the pixel (as, when local power fails, this driving signal might be bad). For that reason it is preferred that the multiplexing driving signals come directly from row/column common buses and again optionally via an optional local resistor as this is an input signal to the pixel. Additionally one might put in the series path of such pixel's output signal a switch that is driven by the pixel's local supply, ensuring that if the local supply fails, the output signal is choked or cut off. This is illustrated also in FIG. 17.

The method to improve the yield of an array of pixels as illustrated in FIG. 17 comprises:

Putting a series resistance $R_{VDD}$ on the VDD connections, optionally also a series resistance $R_{GND}$ on GND connections, and/or Putting a series resistance $R_{in}$ on inputs to the pixels; whereby series resistance means: local to the pixel, e.g. as poly resistance or otherwise, and/or Letting the output be multiplexed via switches $S_{out}$ that are not driven from inside the pixel, and/or Optionally letting the output pass via a pass switch/gate $S_{ins}$ that is powered from inside the pixel, thus if the local power fails, the signal becomes high impedant.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to include any specific characteristics of the features or aspects of the invention with which that terminology is associated.

Many alternative embodiments are possible. One such embodiment relates to the photon counting of visible light photons by avalanche photo diodes (APDs) or similar devices. These produce on the detection of a visible light photon a current pulse that can be treated in a similar way as described above, and the amount of detected photons may be accumulated in the analog domain in a similar way.

The invention claimed is:

1. An array of pixels for the detection of a flash of electromagnetic radiation or a cloud of impinging high energy particles, each pixel comprising:

a radiation receptor that converts the electromagnetic radiation or impinging high energy particles into a radiation signal, and a converter that converts the radiation signal into pulses, wherein the array further comprises:

a circuit that compares one or more criteria: pulse amplitude, pulse arrival time, time to convert a pulse in a digital signal, pulse duration time, pulse rise and fall time or integral of pulse over time for pulses coinciding on pixels in a predetermined neighbourhood, and a circuit that suppresses those pulses that are compared negatively versus the corresponding pulses in another pixel of the neighborhood for the same one or more criteria.

2. An array of pixels according to claim 1, wherein the circuit that suppresses those pulses that are compared negatively versus corresponding pulses in another pixel of the neighborhood for the same one or more criteria comprises circuit elements that suppress the detection made in pixels that are not at the position of the maximum of the flash of electromagnetic radiation or the cloud of impinging high energy particles.

3. An array of pixels according to claim 2, wherein the circuit elements that suppress the detection made in pixels that are not at the position of the maximum of the flash of electromagnetic radiation or the cloud of impinging high energy particles is configured to suppress a pulse in a pixel of interest if the amplitude of the pulse of at least one other pixel in the neighborhood is larger.

4. An array of pixels according to claim 1, wherein a neighborhood of a pixel of interest is formed by pixels not more than 5 consecutive pixels away from the pixel of interest.

5. An array of pixels according to claim 1, wherein the circuit that suppresses those pulses that are compared negatively versus the corresponding pulses in another pixel of the neighborhood for the same one or more criteria comprises a winner-take-all circuit.

6. An array of pixels according to claim 5, wherein the winner-take-all circuit is a local winner-take-all circuit, taking into account a predetermined limited neighborhood around a pixel under consideration.

7. An array of pixels according to claim 1, wherein the array furthermore comprises a circuit that performs coincidence detection on signals detected at different pixels.

8. An array of pixels according to claim 7, wherein the circuit that performs coincidence detection is configured to perform coincidence detection on signals detected at pixels in the predetermined neighborhood.

9. An array of pixels according to claim 1, wherein the array furthermore comprises a circuit that performs logic operation on coinciding pulses of pixels in the predetermined neighbourhood.

10. An array of pixels according to claim 1, furthermore comprising a circuit that determines the position of the maximum of the flash of EM radiation or of the cloud of impinging high energy particles with higher precision than the pixel pitch, the circuit implementing centroiding or superresultion.

11. An array of pixels according to claim 10, wherein at least some of the pixels furthermore comprise a memory element that stores the result of the centroiding operation in a pixel.

12. An array of pixels according to claim 11, the array of pixels being configured to store the result of the centroiding operation in the pixel that is on or near the maximum of the flash or of the cloud.

13. An array of pixels according to claim 10, furthermore comprising a memory element that stores a measure of the spatial extension of the flash or cloud.

14. An array of pixels according to claim 1, wherein the array furthermore comprises a circuit that transfers a pixel value to the strongest pixel in the neighborhood if the pixel itself does not have the strongest pulse, and that retains its value for subsequent pulse amplitude classification if the pixel itself is the local maximum or contains the center of gravity of the flash of electromagnetic radiation or the cloud of impinging high energy particles.

15. Method to improve the sharpness of an image sensor for determining EM or particle radiation of a flash of electromagnetic radiation or a cloud of impinging high energy particles, the method comprising:
  comparing one or more criteria: pulse amplitude, pulse arrival time, time it takes to convert the radiation pulses into an electrical pulse, pulse duration time, pulse rise and fall time or integral of pulse over time for pulses coinciding on pixels of the image sensor in a predetermined neighbourhood, and
  suppressing those pulses that are compared negatively versus the corresponding pulses in a neighbouring pixel for the same one or more criteria.

16. Method according to claim 15, wherein suppressing those pulses that are compared negatively versus the corresponding pulses in another pixel in the neighborhood for the same one or more criteria comprises suppressing a count made in pixels that are not the position of the maximum of the flash of electromagnetic radiation or a cloud of impinging high energy particles.

17. Method according to claim 16, wherein a non-suppressed count constitutes the sensor pixel information.

18. Method according to claim 15, furthermore comprising performing coincidence detection on EM or particle radiation detected by different pixels of the image sensor.

19. Method according to claim 18, wherein performing coincidence detection comprises performing coincidence detection on pixels in a predetermined neighbourhood of each other.

* * * * *